US012351248B2

(12) United States Patent
Prashant Rao et al.

(10) Patent No.: US 12,351,248 B2
(45) Date of Patent: Jul. 8, 2025

(54) ALL-TERRAIN UTILITY VEHICLE AND METHODS THEREOF

(71) Applicant: MAHINDRA & MAHINDRA LIMITED, Mahindra World (IN)

(72) Inventors: Varada Prashant Rao, Bengaluru (IN); Shankar Venugopal, Mahindra World (IN); Sayantan Mukherjee, Haltu Kathgola (IN); Ram Mohan Sitaraman, Mahindra World (IN); Siddhartha Raj, Mahindra World (IN); Snigdharani Epari, Mahindra World (IN); Deepak Saini, Mahindra World (IN); Abhishansha Gautam, Mahindra World (IN); Harsh Patel, Mahindra World (IN); Srinivas Kannan, Mahindra World (IN)

(73) Assignee: MAHINDRA & MAHINDRA LIMITED, Mahindra World (IN)

( * ) Notice: Subject to any disclaimer, the term of this patent is extended or adjusted under 35 U.S.C. 154(b) by 309 days.

(21) Appl. No.: 18/009,551

(22) PCT Filed: Jun. 8, 2021

(86) PCT No.: PCT/IN2021/050555
§ 371 (c)(1),
(2) Date: Dec. 9, 2022

(87) PCT Pub. No.: WO2021/250696
PCT Pub. Date: Dec. 16, 2021

(65) Prior Publication Data
US 2024/0043073 A1  Feb. 8, 2024

(30) Foreign Application Priority Data

Jun. 10, 2020 (IN) .............................. 202041024382

(51) Int. Cl.
*B62D 49/06* (2006.01)
*B62D 7/15* (2006.01)

(52) U.S. Cl.
CPC ....... *B62D 49/0678* (2013.01); *B62D 7/1509* (2013.01)

(58) Field of Classification Search
CPC .......................... B62D 7/1509; B62D 49/0678
See application file for complete search history.

(56) References Cited

U.S. PATENT DOCUMENTS

| | | | | |
|---|---|---|---|---|
| 4,263,979 A | * | 4/1981 | Sturgill | B62D 7/1509 180/411 |
| 2007/0215024 A1 | * | 9/2007 | Sanguinetti | B62D 21/186 111/118 |

(Continued)

*Primary Examiner* — Erez Gurari
(74) *Attorney, Agent, or Firm* — Maschoff Brennan

(57) ABSTRACT

The disclosures herein generally relate to a vehicle and more particularly, to an all-terrain utility vehicle which can perform multiple operations, in varied terrain and soil conditions, with precision and guidance. An all-terrain utility vehicle mainly includes wheel track and wheel base adjusting system, a height adjusting system, a plurality of vertical axle assemblies, a steering system, an implement position adjusting system, a master controller unit and a plurality of wheel drive motors. All the vehicle functions being controlled and guided with the help of an electronic master control module which enables optional manual, remote and autonomous operations. The electronic master control module utilizes externally acquired location data and digital maps with soil and plant information for enabling precision field operations.

17 Claims, 27 Drawing Sheets

(56) References Cited

U.S. PATENT DOCUMENTS

| | | | |
|---|---|---|---|
| 2015/0102593 A1* | 4/2015 | Slawson | B62D 49/06 |
| | | | 280/830 |
| 2015/0291233 A1* | 10/2015 | Dames | B60B 35/1054 |
| | | | 280/638 |
| 2015/0352921 A1* | 12/2015 | Dames | B60G 3/20 |
| | | | 280/5.514 |
| 2016/0297474 A1* | 10/2016 | Shi | F16D 65/14 |
| 2019/0176911 A1* | 6/2019 | Beitzen-Heineke | |
| | | | B62D 49/0678 |
| 2020/0130741 A1* | 4/2020 | Crowley | B62D 7/163 |
| 2021/0260946 A1* | 8/2021 | Tighare | B60G 1/00 |
| 2022/0041203 A1* | 2/2022 | Tighare | B62D 11/08 |
| 2022/0256761 A1* | 8/2022 | Ni | B60K 7/0007 |
| 2022/0332503 A1* | 10/2022 | Flick | G05D 1/0282 |
| 2022/0402546 A1* | 12/2022 | Preijert | B62D 7/1518 |
| 2022/0402730 A1* | 12/2022 | Keller | B66C 1/28 |
| 2023/0095974 A1* | 3/2023 | Franzen | B62D 49/0678 |
| | | | 172/418 |
| 2023/0249601 A1* | 8/2023 | Matthews | E02F 3/7609 |
| | | | 180/204 |
| 2023/0271654 A1* | 8/2023 | LeMay | A01B 63/023 |
| | | | 280/5.514 |
| 2024/0009045 A1* | 1/2024 | Van De Wal | A61G 5/14 |
| 2024/0043073 A1* | 2/2024 | Prashant Rao | B62D 49/0678 |
| 2024/0278640 A1* | 8/2024 | Cho | B62D 7/1509 |
| 2024/0308290 A1* | 9/2024 | Sieve | B60G 17/016 |
| 2024/0317307 A1* | 9/2024 | Sonoura | B60B 33/0073 |

* cited by examiner

20

Unlocking each swing arm (102) from a corresponding swing arm position defining member (106A, 106B) by removing each locking member (108) from a swing arm locking portion (106AL, 106BL) of the corresponding swing arm position defining member (106A, 106B)

↓

Rotating each swing arm (102) to a predefined position with respect to corresponding said swing arm position defining member (106A, 106B), and locking each swing arm (102) to corresponding said swing arm position defining member (106A, 106B) by inserting each locking member (108) into one of plurality of another swing arm locking portions (106AL, 106BL) of the swing arm position defining member (106A, 106B) thereby adjusting a wheel track and a corresponding wheelbase of said vehicle (10)

Unlocking each swing arm (102) from a corresponding first swing arm position defining member (106A) by removing each locking member (108) from a swing arm locking portion (106AL) of the corresponding first swing arm position defining member (106A)

↓

Removing each swing arm (102) from corresponding first pivot assembly (104A) by dis-engaging each swing arm (102) from a pivot pin (104AP) of corresponding first pivot assembly (104A)

↓

Securing each swing arm (102) to a pivot pin (104BP) of corresponding second pivot assembly (104B) thereby adjusting the wheelbase of the vehicle (10)

Receiving, by a master controller unit (802), at least one input from a height adjusting control means (804A, 806A) of one of a first user control module (804) or a second user control module (806) or a sensor module Moving, by a final linearly movable member (202L) of each linear actuator (202) of a height adjusting system (200), a movable upper vertical axle (304) with respect to a stationary lower vertical axle (302) of corresponding vertical axle assembly (300) in a telescopic manner thereby raising or lowering said chassis (1000) with respect to a ground surface (GS) to change a height of said chassis (1000) with respect to said ground surface (GS) when said linear actuators (202) receives instruction(s) from said master controller unit (802) in accordance to inputs sent by one of said first user control module (804) or a said second user control module (806), or said sensor module to the master controller unit (802

Receiving, by a master controller unit (802), at least one input from a first implement position control means (804B, 806B) of one of a first user control module (804) or a second user control module (806), or a sensor module Moving, by a final linearly movable member (702L) of at least one first linear actuator (702), a front end of said implement (1300) in a direction towards or away with respect to a ground surface (GS) thereby adjusting a position of the front end of said implement (1300) when said first linear actuator (702) receive instruction(s) from said master controller unit (802) and while at the same time, rotating by the second linear actuator (704), the rear end of the implement (1300) on receiving instruction from the master controller unit (802) thereby accommodating the change in position of the front end of the implement (1300), in accordance to inputs sent by one of said first user control module (804) or said second user control module (806) or said sensor module, to the master controller unit (802)

Fig. 27

ALL-TERRAIN UTILITY VEHICLE AND METHODS THEREOF

CROSS REFERENCE TO RELATED APPLICATION

This application is based on and derives the benefit of Indian Application 202041024382 filed on 10 Jun. 2020, the contents of which are incorporated herein by reference.

TECHNICAL FIELD

The embodiments herein generally relate to a vehicle and more particularly, to an all-terrain utility vehicle which can perform multiple operations, in varied terrain and soil conditions, with precision and guidance.

BACKGROUND

In general, utility vehicles are made for doing an off-road work including agriculture, horticulture, construction, mining, industry etc., These utility vehicles are specially made for performing a particular kind of work. For example, conventional tractor is specially designed for doing agricultural work, conventional bulldozers are used for doing construction work, conventional excavators are made for used mining work and conventional forklifts are used for performing industry works. However, a single conventional utility vehicle cannot meet all the needs of off-road work vehicle and cannot perform multiple operations in all terrains.

For example, the conventional tractors are having low ground clearance. In a single crop cycle, from land preparation to post harvest, different agricultural implements or machines are required to be used along with the conventional tractor. The conventional tractor has the limitation of working in standing crops for intercultural operations due to its low ground clearance. The conventional tractor may be used to process short crops, as in case of early stage corn or the like, but difficulties arise while processing taller crops, such as mature corn, that are taller than the ground clearance of the tractor. During inter-culture operations, the conventional tractor does not have the flexibility to adjust the ground clearance to suit the crop heights, which would result in damaging the standing crop. Further, conventional utility vehicles have a fixed ground clearance and if the operator aims to increase the ground clearance for specific requirement, the operator either go for a permanent change in ground clearance of the vehicle or needs to choose a different customized vehicle with required ground clearance.

In conventional approaches, the agricultural operations may be performed based on manually driven strategies. Agricultural practices include various agricultural operations (manuring, weeding, harvesting and so on) which can be performed on a region/field under cultivation for efficient production of crops. The agricultural operations can be performed using multiple agricultural machineries (tractors, tillers, harvesters, sprayers and so on or the like). The manually driven strategies can be error prone and inefficient due to dependency on skill set of a farmer. In addition, in order to perform the agricultural operations, the agricultural machineries are operated by the farmer without having real-time information about infected regions, volume of remedy required for the infected regions and so on. Thus, resulting in wastage of resources, overuse of the agricultural machineries and contamination of the environment (water, soil, and air). For example, in the conventional approaches, using the manual driven strategies, the farmer can spray a pesticide on all regions irrespective of an infected region without having any real-time information about the infected region.

Further, the conventional utility vehicles are not flexible. The configuration of the drive elements makes the conventional utility vehicles fixed in terms of length, height and width with minor adjustments possible with mechanical or hydraulic intervention. This makes the machines not compatible or flexible to do multiple tasks in varied terrain and soil conditions. Tire soil dynamics along with weight and size requires different utility vehicles to perform efficiently for dry land, wetland and upland applications.

Further, majority of accidents are happening in conventional utility vehicles due to weight transfer caused by conventional hitch systems. These vehicles also cause damage to soil and plant eco systems due to soil compaction and plant breakage during the crop growth cycle while attempting to move on the field with low or fixed ground clearance and limited maneuverability.

Further, the conventional utility vehicles normally utilize 2 wheeled, 4 wheeled and tracked drive configurations for mobility with a fixed chassis. These utility vehicles are made up of power trains, gearbox and final drives rigidly connected with horizontal axles wherein there is limited or no flexibility in terms adjustment of length, width and height of the vehicle. The power train system of the conventional utility vehicles has a low efficiency of energy utilization and its transfer to the wheels for traction. The weight which is added and sought to be transferred to the ground wheels to create traction also causes uneven distribution, resulting in a loss of stability of the vehicle. The depth of operation is controlled by hydraulic system powered linkages on the front or rear of the machine which consume power and add to cost and complexity. Conventional 2-wheel steering systems have limited maneuverability to operate in restricted space situations.

The conventional utility vehicles are bulky and heavy weight, being complex and expensive with a limited ability to fit into various complicated operations in all types of terrains. Stability and maneuverability of the conventional utility vehicle is difficult due to its heavy weight and bulkiness. Also, the conventional utility vehicle does not have the flexibility to adjust its track width, wheelbase, height and orientation with respect to the ground surface.

Therefore, there exists a need for an all-terrain utility vehicle, which obviates the aforementioned drawbacks.

OBJECTS

The principal object of embodiments herein is to provide an all-terrain utility vehicle.

Another object of embodiments herein is to provide an all-terrain utility vehicle that can be used to perform multiple operations, in varied terrain and soil conditions, with precision and guidance.

Another object of embodiments herein is to provide a method of adjusting height of chassis of the vehicle.

Another object of embodiments herein is to provide a method of adjusting wheel track and wheel base of the vehicle.

Another object of embodiments herein is to provide a method of adjusting a wheel base of the vehicle.

Another object of embodiments herein is to provide a method of adjusting orientation of an implement which is movably coupled below and at the center or away from the center of the chassis of the vehicle.

Another object of embodiments herein is to provide an all-terrain utility vehicle with a height adjusting system which is configured to vary a chassis height of the vehicle with respect to a ground surface.

Another object of embodiments herein is to provide an all-terrain utility vehicle with a wheel track and base adjusting system which is configured to vary a wheel track and a wheelbase of the vehicle.

Another object of embodiments herein is to provide an all-terrain utility vehicle with a steering system adapted to independently control steering of each wheel of the vehicle.

Another object of embodiments herein is to provide an all-terrain utility vehicle with an implement mounting system adapted to engage an implement at various locations on the chassis of the vehicle. The orientation of the implement can be adjusted to enable the use of soil forces to improve the traction of the driving wheels and control the depth of operation of the implement when mounted below the chassis.

Another object of embodiments herein is to provide an all-terrain utility vehicle with a steering system adapted to operate the vehicle in multiple steering modes including a two-wheel steering mode, an all-wheel steering mode (including zero turning radius steering mode) and a crab steering mode (diagonal steering mode).

Another object of embodiments herein is to provide an all-terrain utility vehicle with at least one of semi-autonomous and autonomous guidance to the vehicle along with variable rate application with implements.

Another objective of embodiments herein is to provide an all-terrain utility vehicle which ensures a good ride quality and ground following ability by the wheels of the vehicle in all types of terrain by providing individual wheel suspension.

Another objective of embodiments herein is to reduce the overall size and weight of an all-terrain utility vehicle such as a tractor to minimize damage to plants and soil, as traction is achieved by proportional transfer of implement soil forces on to the wheels.

These and other objects of embodiments herein will be better appreciated and understood when considered in conjunction with following description and accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments are illustrated in the accompanying drawings in which:

FIG. 24 depicts a flowchart indicating a method for adjusting wheel track and wheelbase of the all-terrain utility vehicle, according to embodiments as disclosed herein;

FIG. 25 depicts a flowchart indicating a method for adjusting wheelbase of the all-terrain utility vehicle, according to embodiments as disclosed herein;

FIG. 26 depicts a flowchart indicating a method for adjusting height of chassis of the all-terrain utility vehicle, according to embodiments as disclosed herein; and FIG. 27 depicts a flowchart indicating a method for adjusting position of an implement coupled to the all-terrain utility vehicle, according to embodiments as disclosed herein.

DETAILED DESCRIPTION

Figure 1:
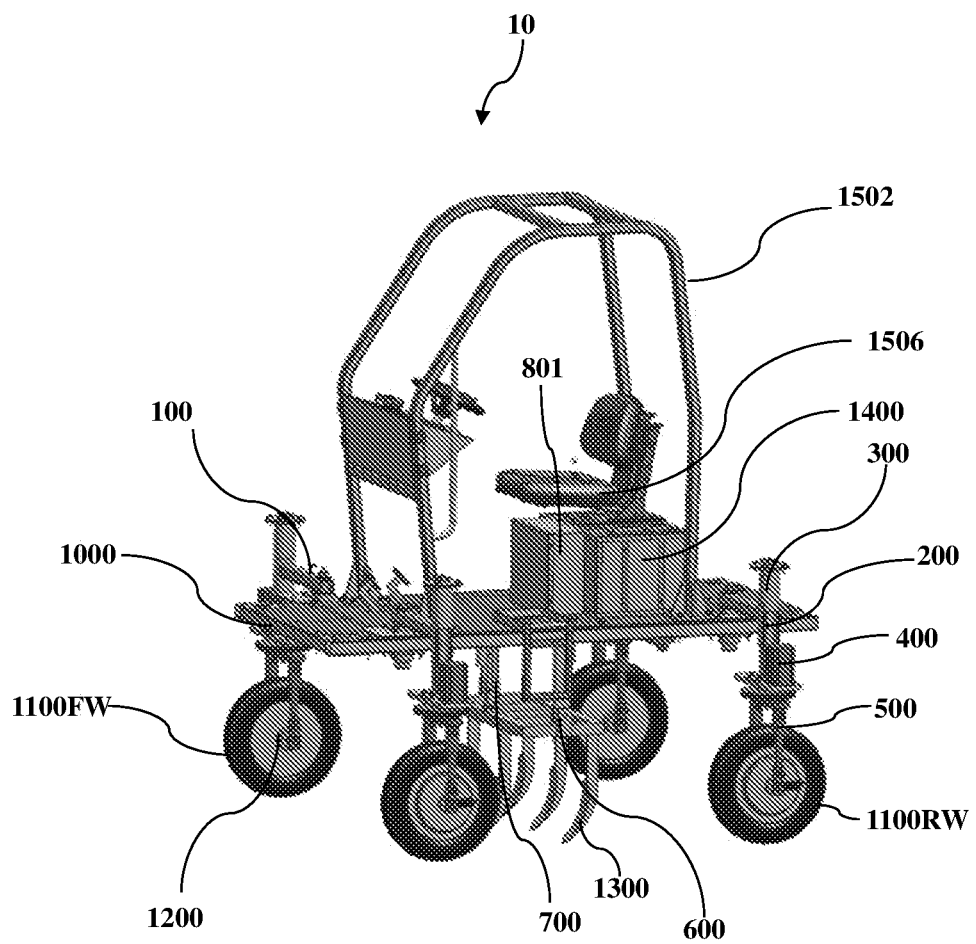
FIG. 1 depicts a perspective view of an all-terrain utility vehicle, according to embodiments as disclosed herein.
Figure 2:
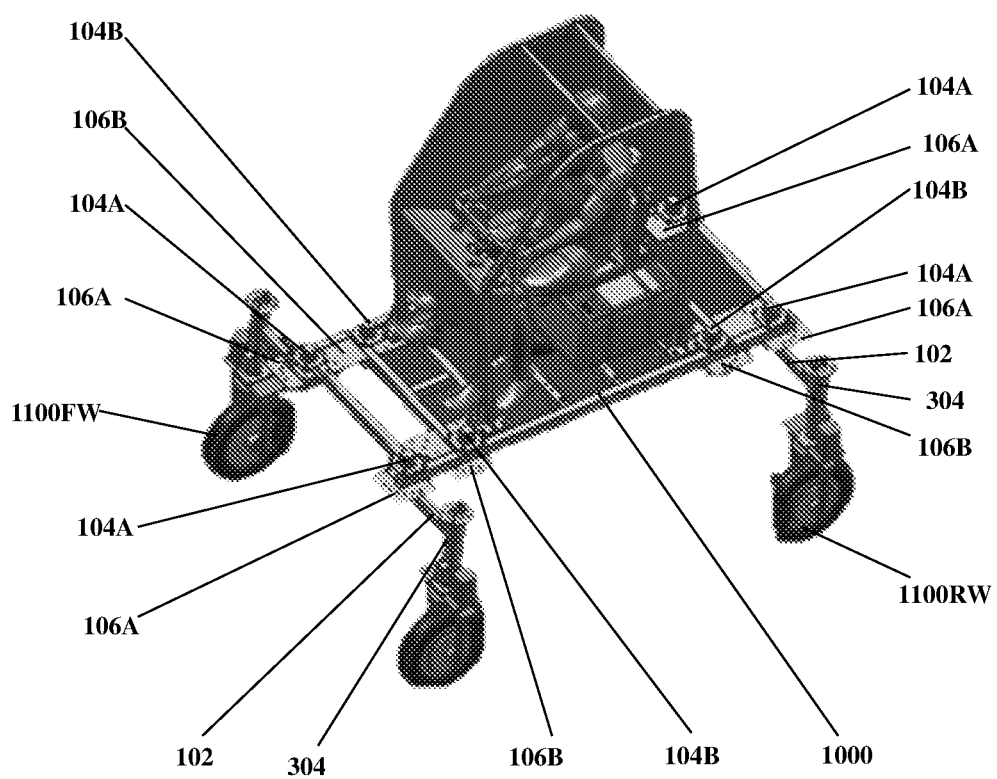
FIG. 2 depicts perspective view of the all-terrain utility vehicle in a first wheelbase position in which each swing arm is pivotably connected to a chassis through corresponding first pivot assembly of a wheel track and wheelbase adjusting system, according to embodiments as disclosed herein.
Figure 3:
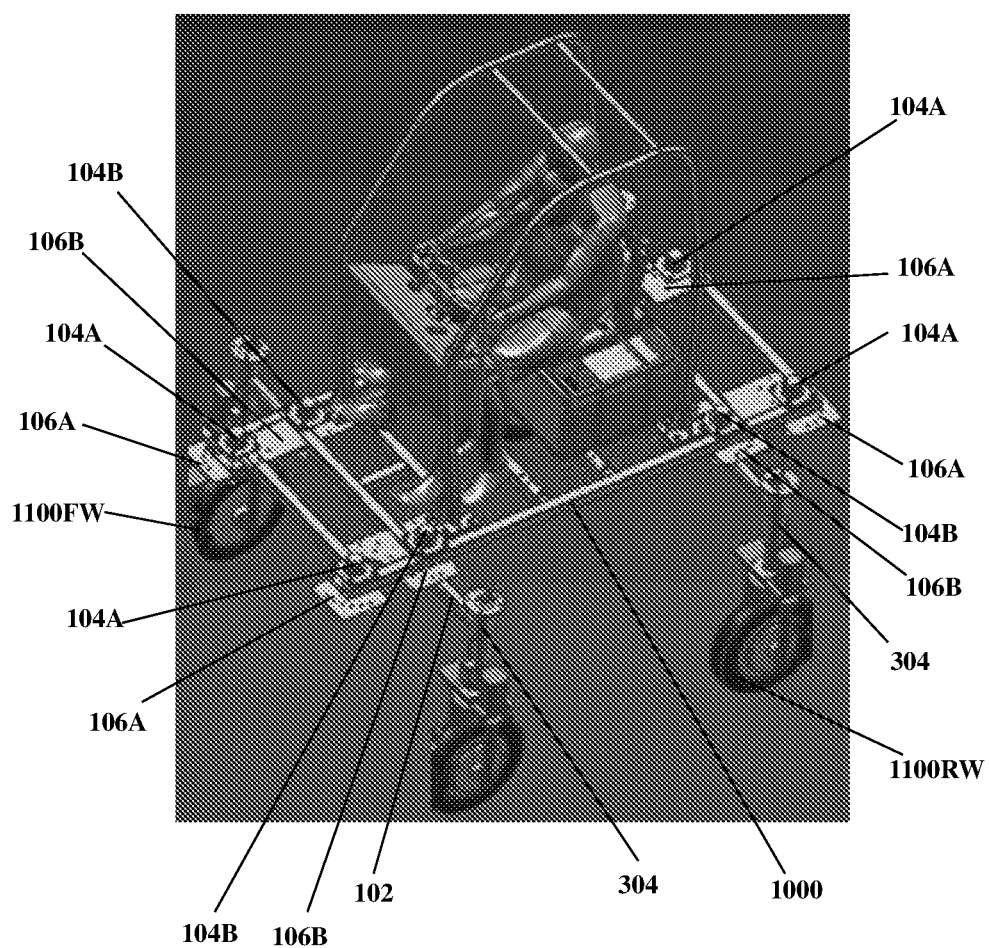
FIG. 3 depicts perspective view of the all-terrain utility vehicle in a second wheelbase position in which each swing arm is pivotably connected to the chassis through corresponding second pivot assembly the wheel track and wheelbase adjusting system, according to embodiments as disclosed herein.
Figure 4:
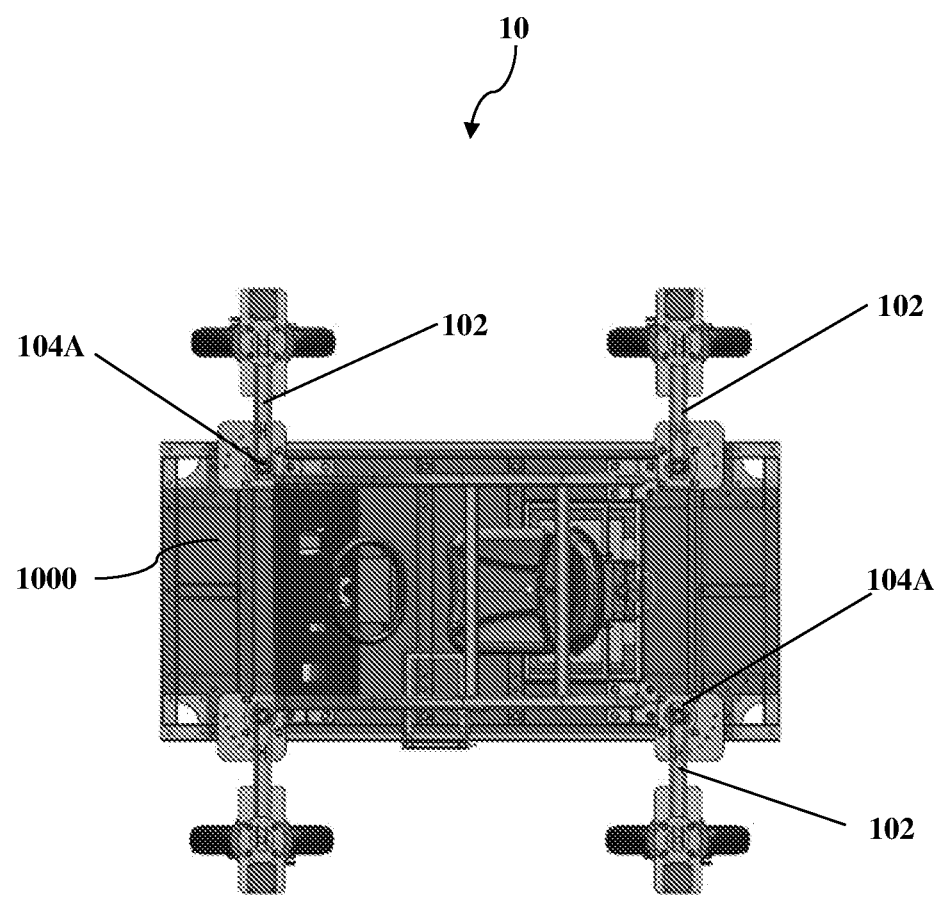
FIG. 4 depicts a top view of the all-terrain utility vehicle showing the wheel track and wheelbase adjusting system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve an all-terrain utility vehicle which can perform multiple operations, in varied terrain and soil conditions, with precision and guidance. Referring now to the drawings FIGS. 1 through 27, where similar reference characters denote corresponding features consistently throughout the figures, there are shown embodiments.

Figure 8A:
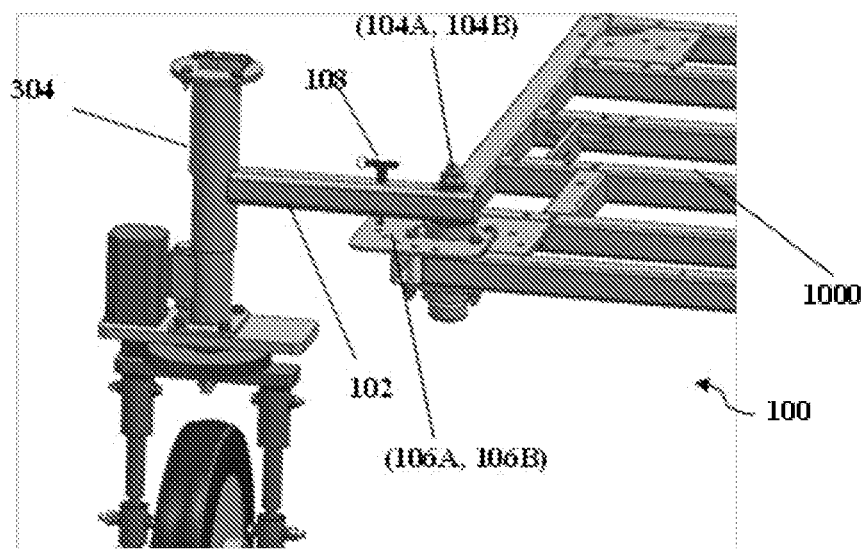
FIG. 8a depicts a perspective view of a portion of a wheel track and wheelbase adjusting system of the all-terrain utility vehicle, according to embodiments as disclosed herein.
Figure 8B:
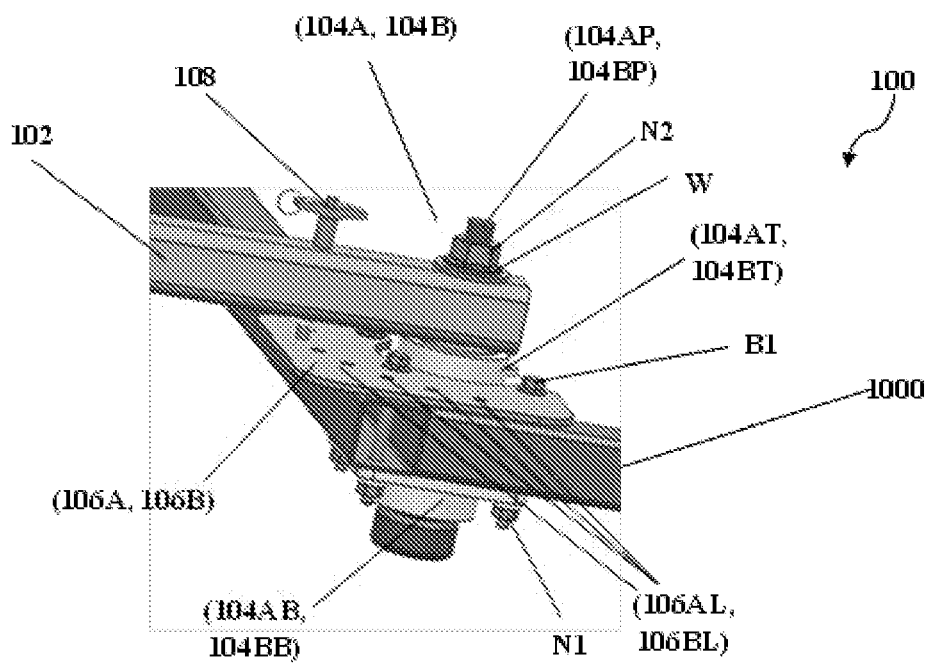
FIG. 8b depicts a pivot assembly, a swing arm, a swing arm positioning defining member and a locking member of the wheel track and wheelbase adjusting system, according to embodiments as disclosed herein.
Figure 9:
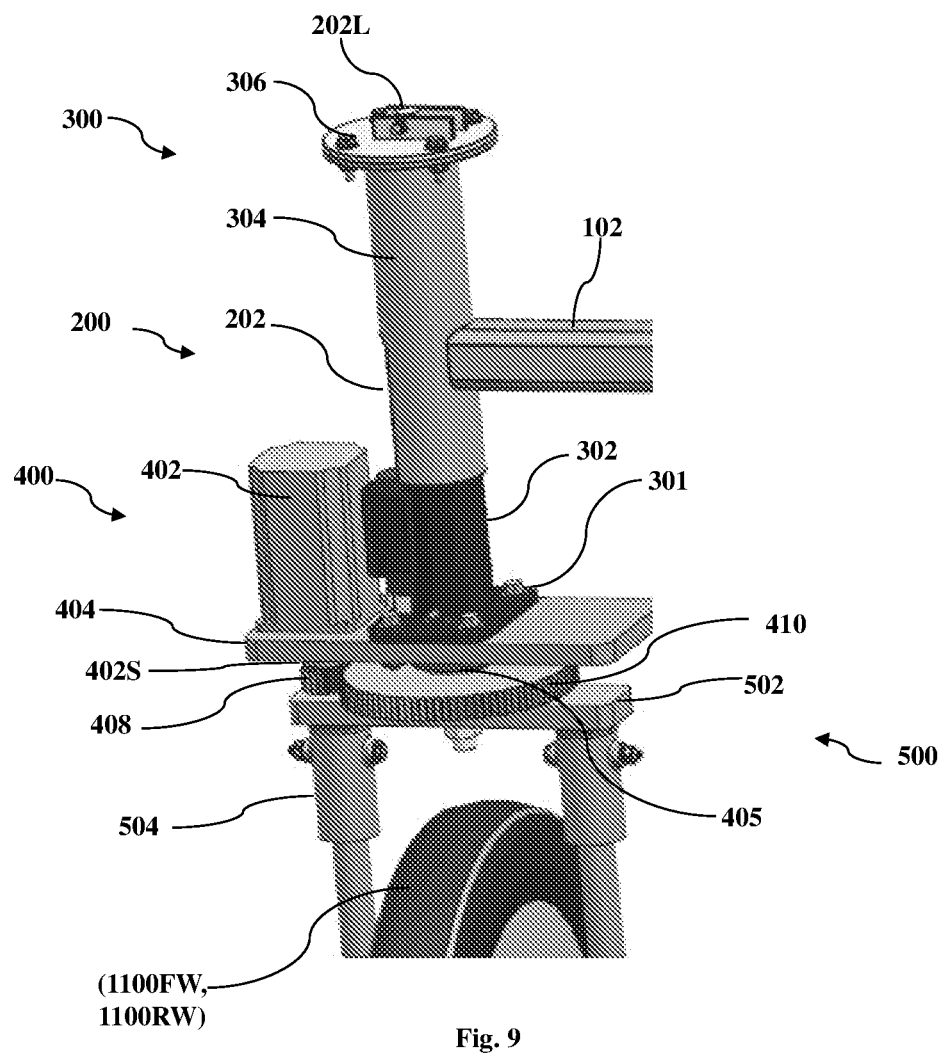
FIG. 9 depicts one of a vertical axle assembly, linear actuator of a height adjusting system, steering motor of a steering system and suspension units of a suspension system of the all-terrain utility vehicle, according to embodiments as disclosed herein.
Figure 14:
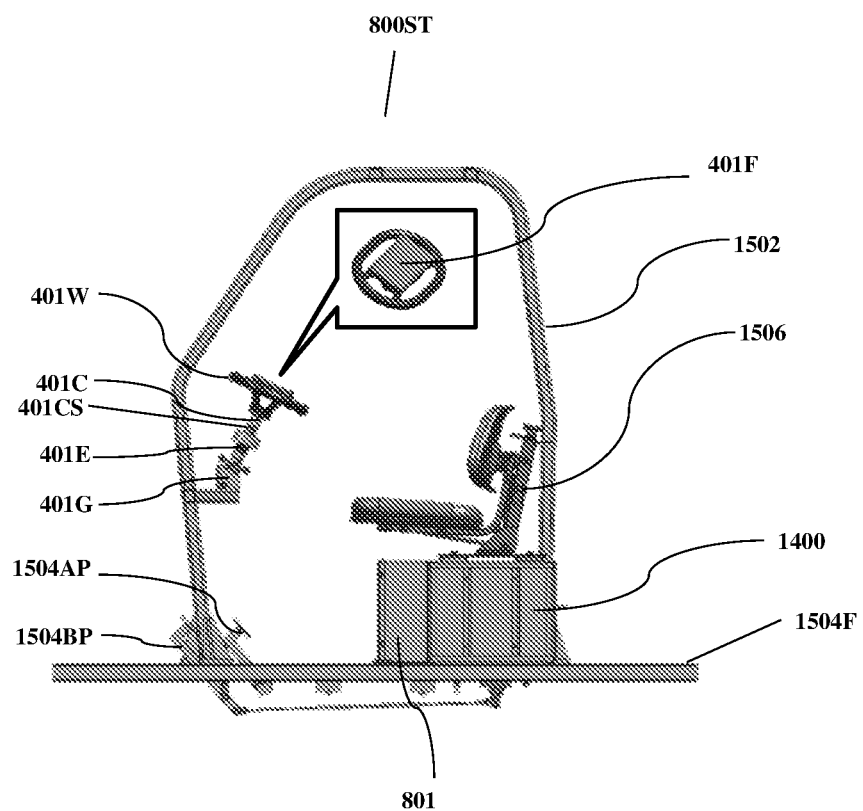
FIG. 14 depicts an operator station with driver seat and controls of the all-terrain utility vehicle, according to embodiments as disclosed herein.
Figure 15:
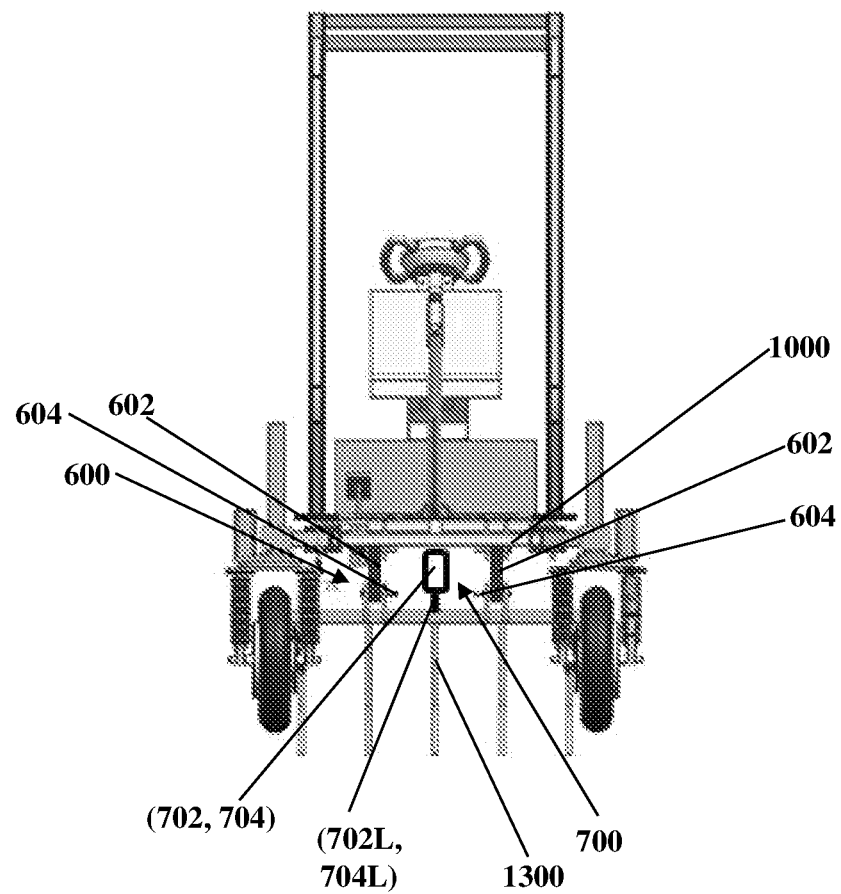
FIG. 15 depicts front view of the all-terrain utility vehicle in which an implement mounting system is used to mount the implement at center and below the chassis, according to embodiments as disclosed herein.
Figure 16:
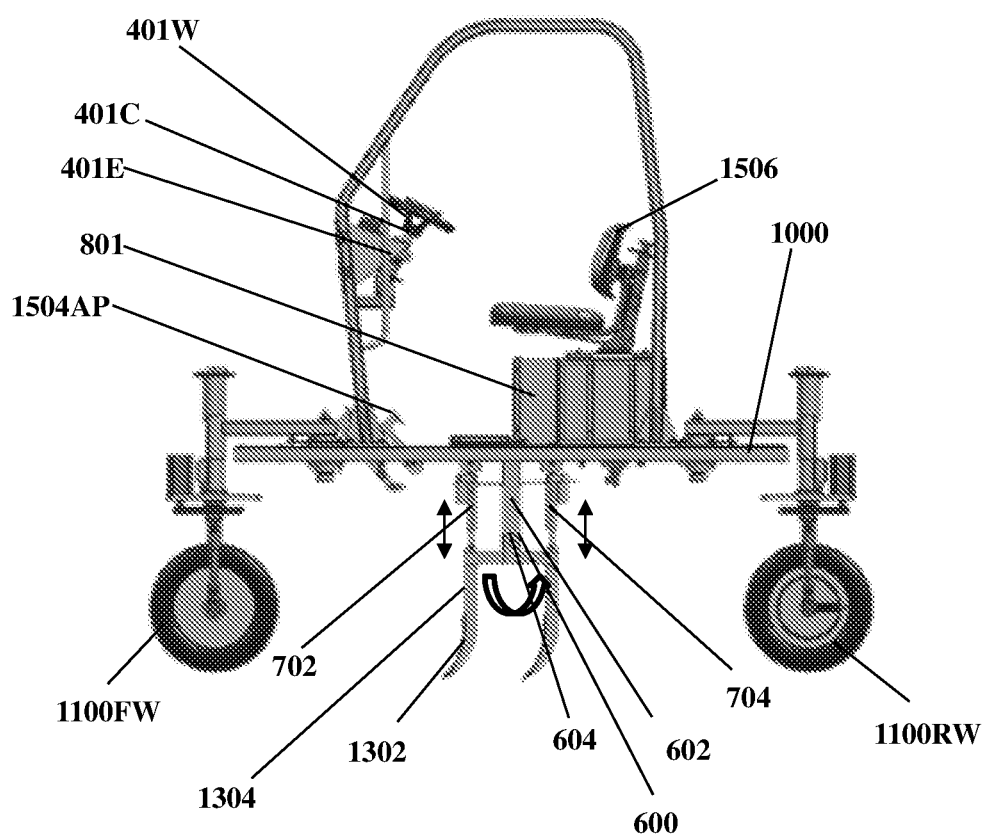
FIG. 16 depicts side view of all-terrain utility vehicle in which linear actuators of an implement position adjusting system is used for adjusting position of the implement, according to embodiments as disclosed herein.
Figure 18:
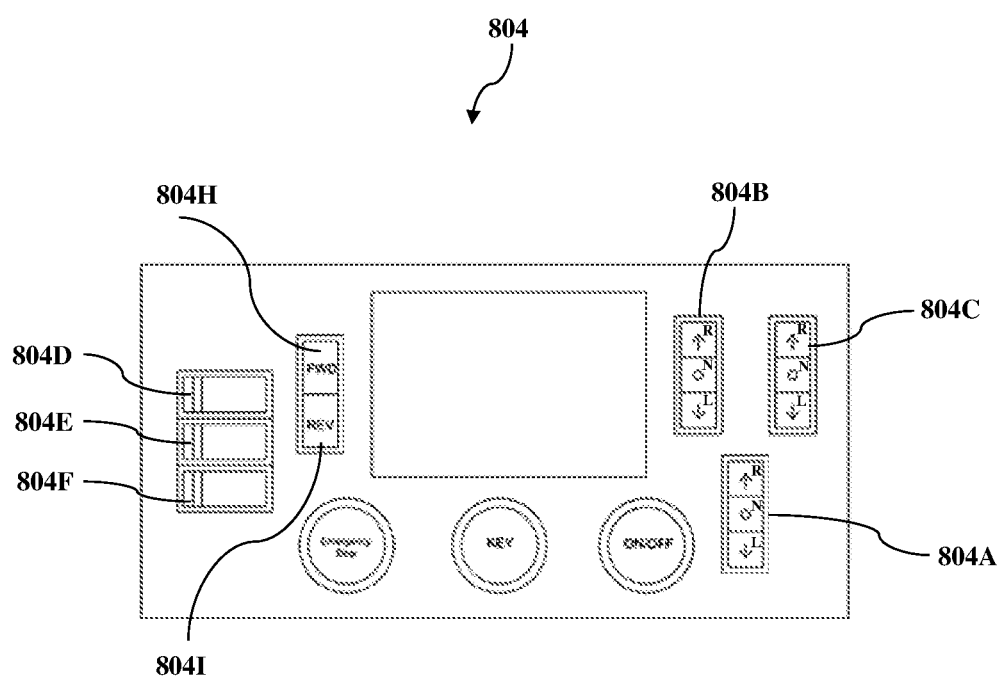
FIG. 18 depicts a schematic diagram of a first user control module, according to embodiments as disclosed herein.
Figure 19:
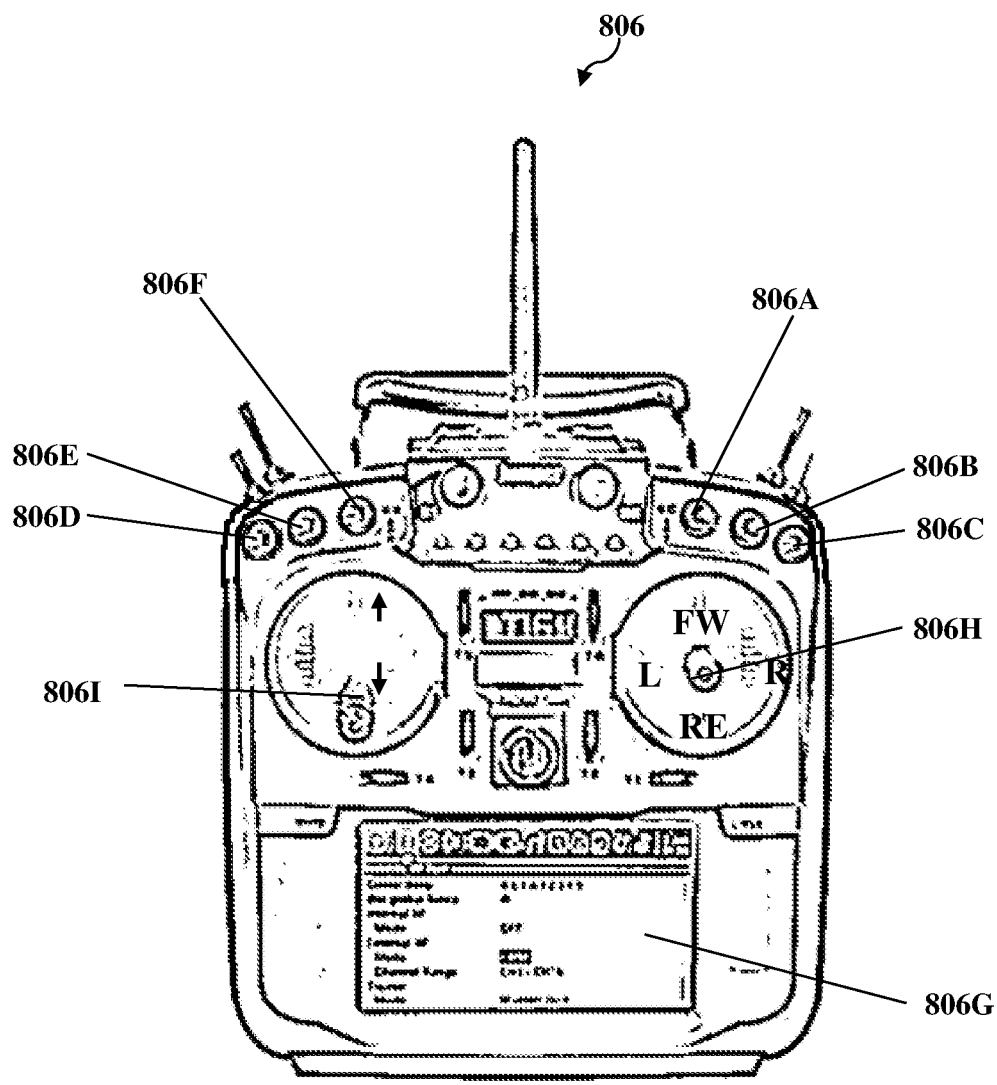
FIG. 19 depicts a schematic diagram of a second user control module, according to embodiments as disclosed herein.
Figure 20:
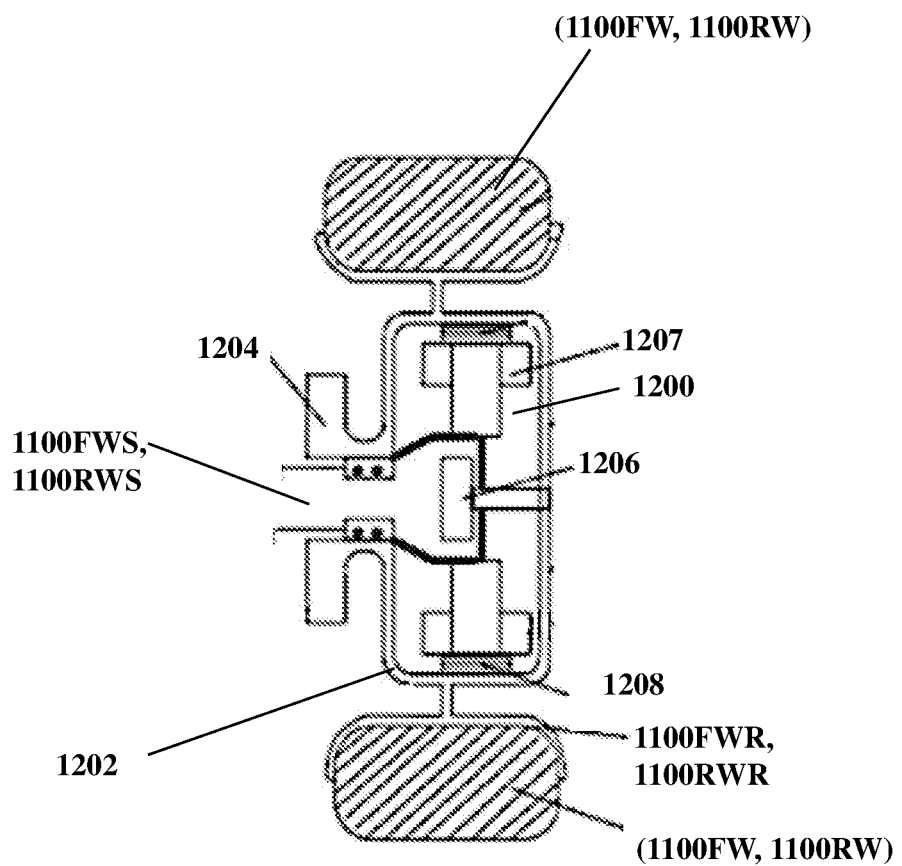
FIG. 20 depicts a cross sectional view of wheel and wheel drive motor in assembled condition, according to embodiments as disclosed herein.
Figure 21:
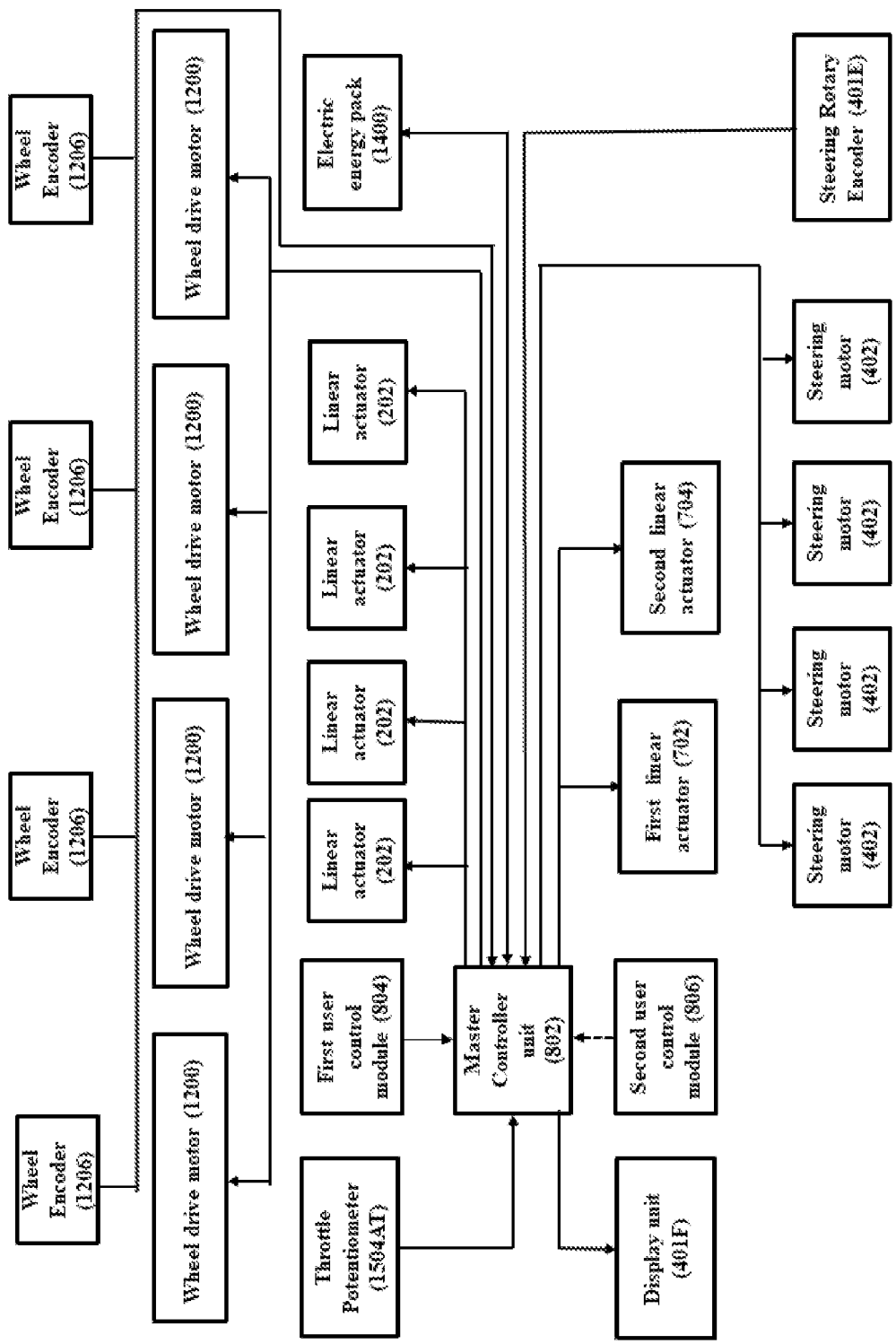
FIG. 21 depicts a block diagram showing a master controller unit in communication with each linear actuator of the height adjusting system, each steering motor, each linear actuator of the implement position adjusting system, the first user control module, the second user control module, wheel drive motor, a steering rotary encoder of the steering system and at least one drone, according to embodiments as disclosed herein.

FIG. 1 depicts a perspective view of an all-terrain utility vehicle (10), according to embodiments as disclosed herein. In an embodiment, the all-terrain utility vehicle (10) includes a wheel track and wheel base adjusting system ((100) (as shown in FIG. 1 to FIG. 7)), a height adjusting system ((200) (as shown in FIG. 1, FIG. 8 and FIG. 9)), a plurality of vertical axle assemblies ((300) (as shown in FIG. 1 to FIG. 5)), a steering system ((400) (as shown in FIG. 1, FIG. 9 and FIG. 11)), a wheel suspension system ((500) (FIG. 1, FIG. 10 and FIG. 11)), an implement mounting system ((600) (as shown in FIG. 1, FIG. 15 and FIG. 16)), an implement position adjusting system ((700) (as shown in FIG. 15 and FIG. 16), an enclosure (801), a master controller unit ((802) (as shown in FIG. 21)), a first user control module ((804) (as shown in FIG. 18)), a second user control module ((806) (as shown in FIG. 19)), a chassis ((1000) (as shown in FIG. 1, FIG. 4, FIG. 6, FIG. 8a, FIG. 10, FIG. 15, and FIG. 16)), a plurality of wheels ((1100FW, 1100RW) (as shown in FIG. 1, FIG. 2, FIG. 3, FIG. 9 to FIG. 13), a plurality of wheel drive motors ((1200) (as shown in FIG. 1, FIG. 11 and FIG. 20)), an implement ((1300) (as shown in FIG. 1, FIG. 15 to FIG. 16)), at least one electric energy pack ((1400) (as shown in FIG. 1 and FIG. 14)), a canopy roll over protector ((1502) (as shown in FIG. 1)), a brake pedal ((1504), an accelerator pedal ((1504 AP) (as shown in FIG. 14)), a throttle potentiometer ((1504AT) (as shown in FIG. 14)) and an operator seat ((1506) (as shown in FIG. 1 and FIG. 14)).

As shown in FIG. 1 to FIG. 8b, the wheel track and wheelbase adjusting system (100) is configured to vary a wheel track and a corresponding wheelbase of the all-terrain utility vehicle (10). In an embodiment, the wheel track and base adjusting system (100) comprises a plurality of pivot assemblies (104A, 104B), a plurality of swing arms (102), a plurality of swing arm position defining members (106A, 106B) and a plurality of locking members (108). One end of each swing arm (102) is pivotably connected to the chassis (1000) through corresponding pivot assembly (104A, 104B) and another end of each swing arm (102) is connected to corresponding movable upper vertical axle (304). Each swing arm (102) is hinged to the chassis (1000) through corresponding pivot assembly (104A, 104B), which allows corresponding movable upper vertical axle (304) to articulate about a corresponding pivot assembly (104A, 104B) on the chassis (1000). Each pivot assembly (104A, 104B) is positioned on the chassis (1000) of the all-terrain utility vehicle (10). The plurality of pivot assemblies (104A, 104B) comprises a plurality of first pivot assemblies (104A) and a plurality of second pivot assemblies (104B). Each first pivot assembly (104A) is in-line and spaced away from corresponding second pivot assembly (104B). Each first and second pivot assembly (104A, 104B) comprises a top mounting bracket (104AT, 104BT), a bottom mounting bracket (104AB, 104BB), a top bearing (104AR, 104BR), a bottom bearing (104AS, 104BS) and a pivot pin (104AP, 104BP). The top mounting bracket (104AT, 104BT) adapted to be positioned on a corresponding portion of the chassis (1000). The bottom mounting bracket (104AB, 104BB) adapted to be positioned on another corresponding portion of the chassis (1000). The top bearing (104AR, 104BR) adapted to be disposed inside the top mounting bracket (104AT, 104BT). The bottom bearing (104AS, 104BS) adapted to be disposed inside the bottom mounting bracket (104AB, 104BB). The pivot pin (104AP, 104BP) adapted to pivotably connect corresponding swing arm (102) to the chassis (1000) through corresponding bearings (104AR, 104BR, 104AS, 104BS). Each swing arm position defining member (106A, 106B) is coupled to the chassis (1000). The plurality of swing arm position defining members (106A, 106B) comprises a plurality of first swing arm position defining members (106A) and a plurality of second swing arm position defining members (106B), where each first swing arm position defining member (106A) is in-line and spaced away from corresponding second swing arm position defining member (106B). Each first and second swing arm position defining member (106A, 106B) defines a plurality of swing arm locking portions (106AL, 106BL). Each locking member (108) is adapted to secure corresponding swing arm (102) to the corresponding swing arm position defining member (106A, 106B).

Each swing arm (102) is adapted to be pivotably connected to the chassis (1000) through corresponding one of the first pivot assembly (104A) or the second pivot assembly (104B) thereby changing a wheelbase of the all-terrain utility vehicle (10). A portion of each locking member (108) is adapted to be received by one of the plurality of swing arm locking portions (106AL, 106BL) of corresponding one of the first swing arm position defining member (106A) or the second swing arm position defining member (106B) thereby adjusting a wheel track and corresponding wheel base of the all-terrain utility vehicle (10). Each swing arm position defining member (106A, 106B) is immediately positioned below top mounting bracket (104AT, 104BT) of corresponding pivot assembly (104A, 104B). Each swing arm position defining member (106A, 106B), and the top mounting bracket (104AT, 104BT) and bottom mounting bracket (104AB, 104BB) of each pivot assembly (104A, 104B) is secured to the chassis (1000) by using fasteners (B1, N1), where each fastener (B1, N1) is a bolt (B1) and nut (N1). Each swing arm (102) is secured to corresponding pivot pin (104AP, 104BP) by using fasteners (W, N2), where each fastener (W, N2) is a nut (N2) and washer (W).

In another embodiment, the pivot assembly (104A, 104B) can be moved on the chassis (1000) to various positions with respect to the center line axis of the vehicle to change the wheelbase and relative location of a driver station as shown in FIG. 1 and FIGS. 2 to 5). The wheel track and wheelbase adjusting system (100) enables the vehicle to be scalable longitudinally and transversally through articulation of the swing arms (102) and their position on the chassis (1000). Each pivot pin 104AP, 104BP) adapted to pivotably connect corresponding swing arm (102) to the chassis (1000) through the corresponding bearings (104AR, 104BR, 104AS, 104BS). Each pivot assembly (104A, 104B) is connected to the chassis (1000) at respective location. Each pivot bracket (104) is adapted to support one end of corresponding swing arm (102). Each of the sector plate (106) and locking member (108) is adapted to lock corresponding swing arm (102) in adjusted position. The advantages of the wheel track and wheelbase adjusting system (100) are as follows. The wheel track can be easily adjusted and locked in position to adjust to various crop row spacing. The wheel base change either as a consequence of the rotation of the swing arm (102) or by shifting the pivot assembly (104A, 104B) of the swing arm (102) can be utilized to improve the stability of the vehicle in operation with various implements, terrains and gradients.

Figure 5:
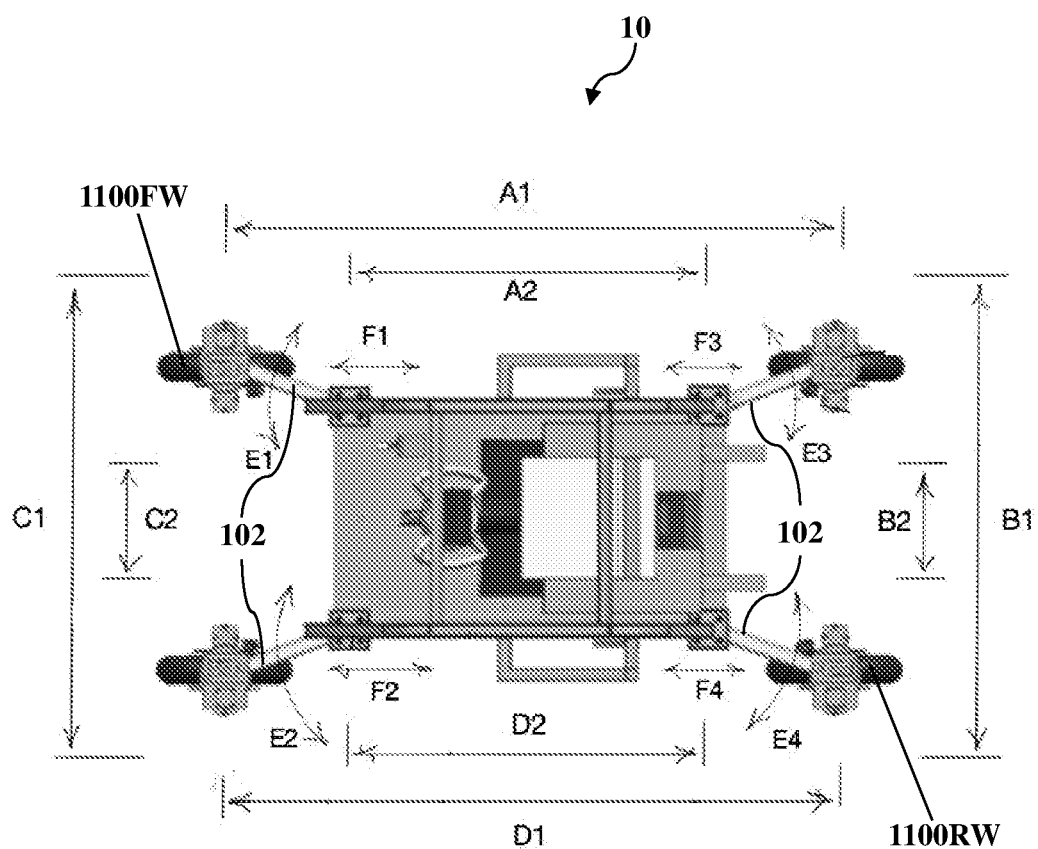
FIG. 5 depicts a top view of the all-terrain utility vehicle with illustration of the adjustments for adjusting wheel track and wheelbase of the vehicle, according to embodiments as disclosed herein.
Figure 6:
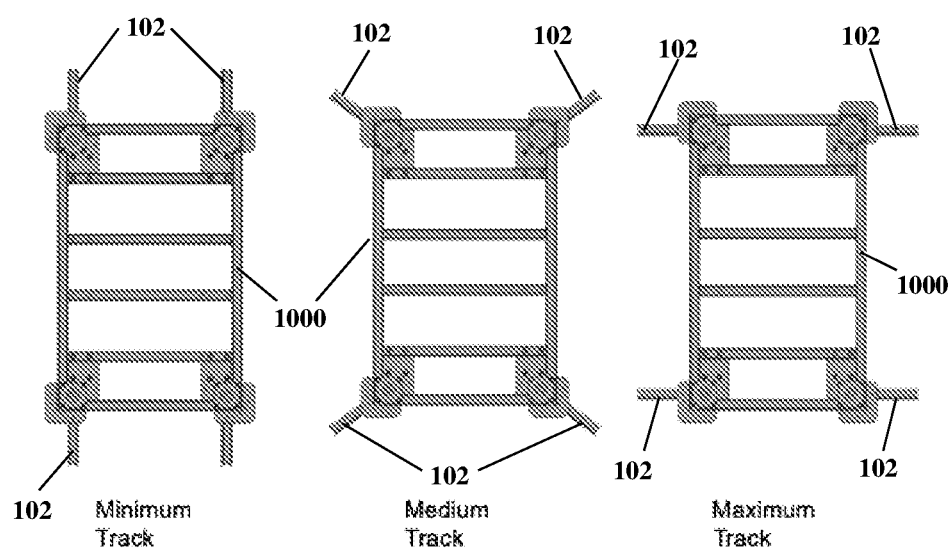
FIG. 6 depicts various wheel tracks adjustments of the vehicle in which the swing arms are positioned at various adjusted positions with respect to swing arm position adjusting members, according to embodiments as disclosed herein.
Figure 7:
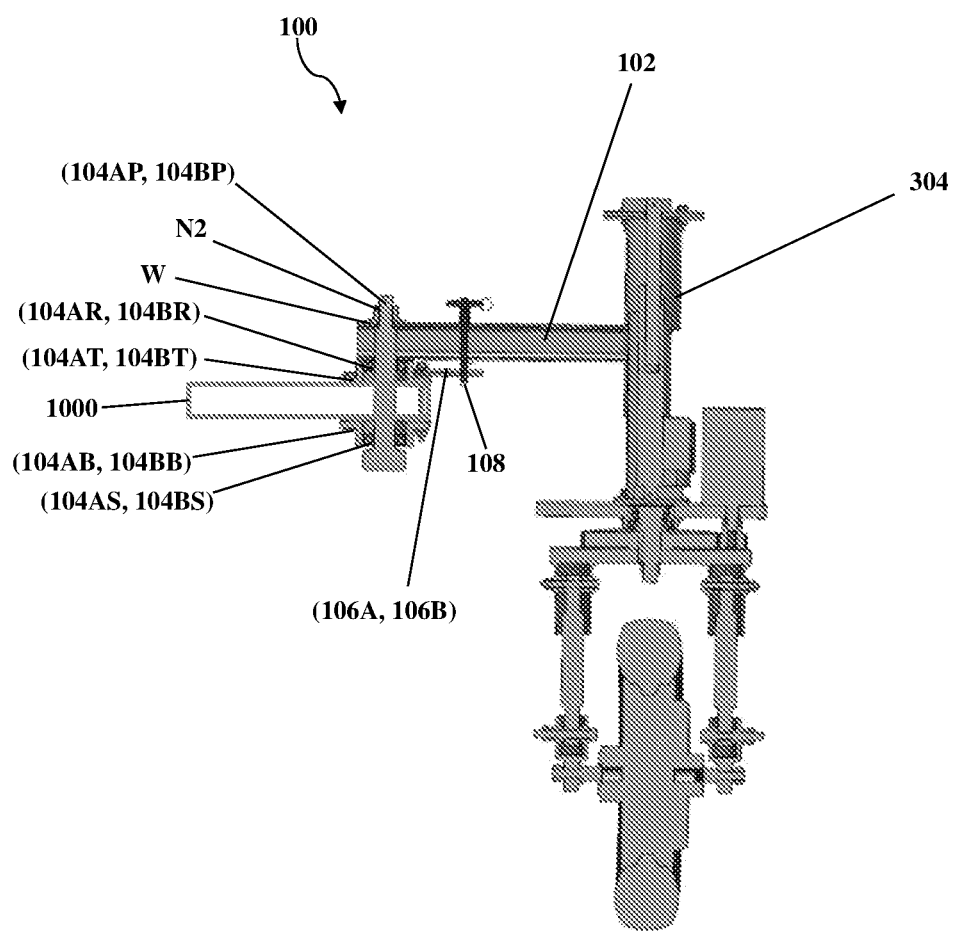
FIG. 7 depicts a cross-sectional view of the pivot assembly, the swing arm, the swing arm positioning defining member and the locking member of the wheel track and wheelbase adjusting system, according to embodiments as disclosed herein.

FIG. 5 depicts the top view of the all-terrain utility vehicle (10) with illustration of the adjustments for wheel track and wheelbase, according to embodiments as disclosed herein. In another embodiment, the swing arms (102) can be moved automatically by using rotary actuators and/or linear actuators for changing the wheel track and wheelbase of the vehicle. The rear swing arms (102) can swivel through angles (E3 and E4) thereby resulting in the change of wheel track and width of rear wheels (1100RW) of the all-terrain utility vehicle (10) from B1 to B2, where a wheel track and width of the rear wheels (1100RW) of the all-terrain utility vehicle (10) at B2 is smaller than B1. Similarly, the front swing arms (102) is adapted to swivel through angles (E1 and E2) thereby resulting in change of wheel track and width of the front wheels (1100FW) of the all-terrain utility vehicle (10) from C1 to C2, where a wheel track and width of the all-terrain utility vehicle (10) at C2 is smaller than C1. The rear swing arms (102) and the front swing arms (102) are the swing arms (102) which are disposed at rear-end and a front-end of the all-terrain utility vehicle (10) respectively. The wheelbase also changes with the rotation of the swing arms (102). Further, wheelbase of the vehicle can also be adjusted by the movement of the pivot brackets of the swing arms (102) linearly on the chassis (1000) with movements F1 to F4. This results in wheelbase change from A1-A2 and D1-D2. For example, the pivot bracket (104A, 104B) adjacent to the right side swing arms (102) is adapted to be linearly moved on the chassis (1000) with respect to movements (F1 and F3) thereby resulting in change of the wheel base of the right side wheels (1100FW, 1100RW) of the vehicle from A1 to A2. The wheelbase of the vehicle at A2 is smaller than A1. Similarly, the pivot assembly (204) adjacent to the left side swing arms (102) is adapted to be linearly moved on the chassis (1000) with respect to movements (F2 and F4) thereby resulting in change of the wheel base of the left side wheels (1100FW, 1100RW) of the vehicle from D1 to D2. The wheelbase of the vehicle at D2 is smaller than D1. The right side swing arms (102) and the left side swing arms (102) are disposed at right side and left side of the all-terrain utility vehicle (10) respectively.

Figure 10:
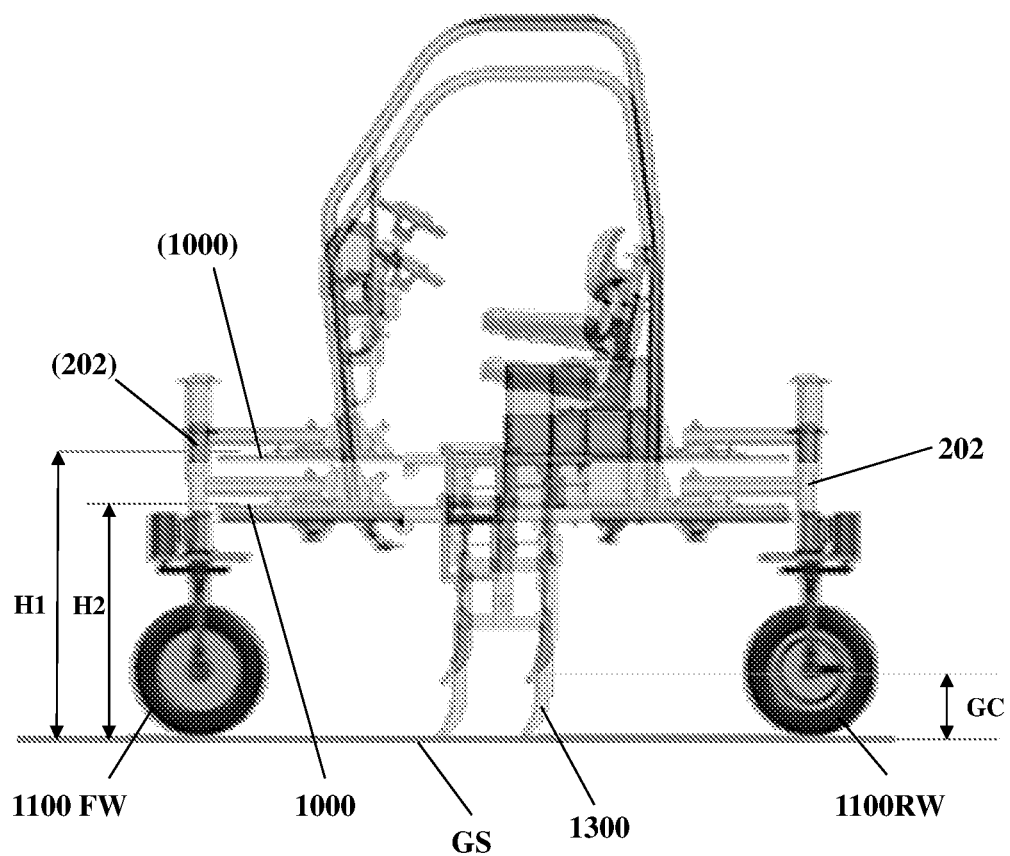
FIG. 10 depicts superimposed view of the all-terrain utility vehicle showing the chassis adjusted at various heights with respect to ground surface, according to embodiments as disclosed herein.
Figure 11:
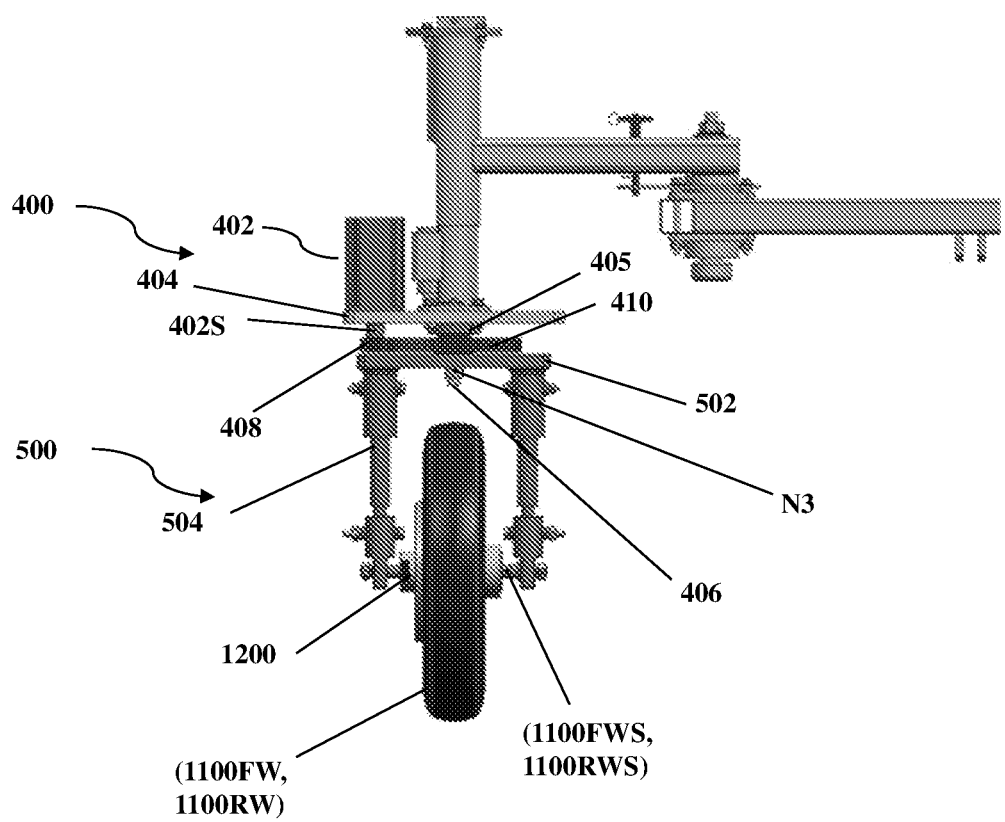
FIG. 11 depicts one of the steering motor of the steering system coupled to corresponding wheel of the vehicle, according to embodiments as disclosed herein.

FIG. 1, FIG. 9, FIG. 10 and FIG. 12 depicts the vertical axle assembly (300) and the height adjustment system (200) of the all-terrain utility vehicle (10), according to embodiments as disclosed herein. The height adjusting system (200) is configured to vary a height of the chassis (1000) with respect to a ground surface (GS). For example, the height adjusting system (200) is adapted to raise or lower the chassis (1000) with respect to ground surface (GS). In an embodiment, the height adjusting system (200) comprises a plurality of linear actuators (202). Each linear actuator (202) includes a final linearly movable member (202L) adapted to be coupled to corresponding movable upper vertical axle (304). For the purpose of this description and ease of understanding, each linear actuator (202) is considered to be an electric linear actuator. In another embodiment, each linear actuator (202) is one of electro-magnetic linear actuator or a pneumatic linear actuator or a hydraulic linear actuator. The final linearly movable member (202L) of each linear actuator (202) of the height adjusting system (200) is adapted to move corresponding movable upper vertical axle (304) with respect to the stationary lower vertical axle (302) in a telescopic manner thereby raising or lowering the chassis (1000) with respect to a ground surface (GS) to change a height of the chassis (1000) with respect to the ground surface (GS) when the linear actuators (202) receives instruction(s) from the master controller unit (802). As shown in FIG. 10, the chassis (1000) is adjusted at one of the plurality of heights (H1, H2) with respect to ground surface (GS) and a distance between the implement (1300) and the ground surface (GS) is the ground clearance (GC).

Figure 17:
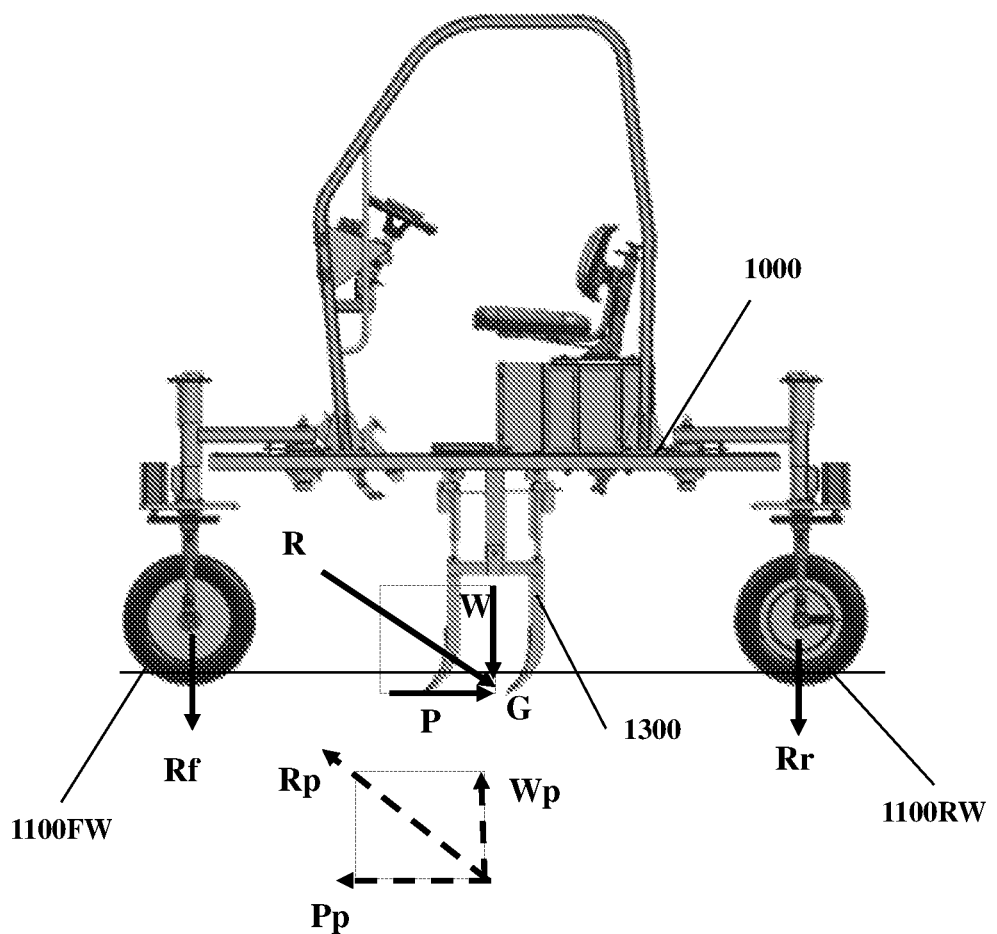
FIG. 17 depicts the implement with illustration of forces acting on the implement while operating the implement on the ground surface, according to embodiments as disclosed herein.

In one embodiment, the master controller unit (802) is triggered by one of manually or automatically therein to operate the plurality of linear actuators (202). For example, the master controller unit (802) is adapted to operate the plurality of linear actuators (202) to move the final linearly movable member (202L) of each linear actuator to one of an extended position or a retracted position thereby adjusting the height of the chassis (1000) with respect to ground surface (GS), based on inputs received from one of the first user control module (804) and the second user control module (806) or a sensor module. This enables the chassis (1000) of the all-terrain utility vehicle (10) to be adjusted vertically to facilitate fitment of various implements to the implement mounting system (600) thereby mounting the implement (1300) at centre and below the chassis (1000) of the all-terrain utility vehicle (10). Once the implement (1300) is hitched to the implement mounting system (600), the operator can precisely control the depth of the implement by varying the chassis height. Further, the wheels (1100FW, 1100RW) of the vehicle act as the ground wheels of the implement (1300) and provide terrain following ability to maintain the set depth. If there is a change in soil resistance, the draft force can be adjusted to the desired wheel slip which is monitored by the master controller 802 with the wheel motor controller and by adjusting the height of the chassis. Further, mounting the implement (1300) below the chassis (1000) directs the draft pull to increase the vertical downward component on all the wheels proportionate to the draft pull and improving traction and reducing the need to add dead weight on the wheels as depicted in FIG. 17. Thus, making the vehicle dynamic mass adjustable to the soil forces and vehicle dead weight is kept minimum thereby reducing the vehicle cost as no additional ballast weight is required. Further the lower vehicle weight reduces soil compaction and improves plant growth.

In another embodiment, the controls for actuating linear actuators (202) are provided on the second user control module (806) FIG. 19 (remote RF handheld device) for remote operation with a joystick. Therefore, the height adjusting system (200) is adapted to adjust the height of the chassis (1000) along longitudinal axis of movement.

Figure 12:
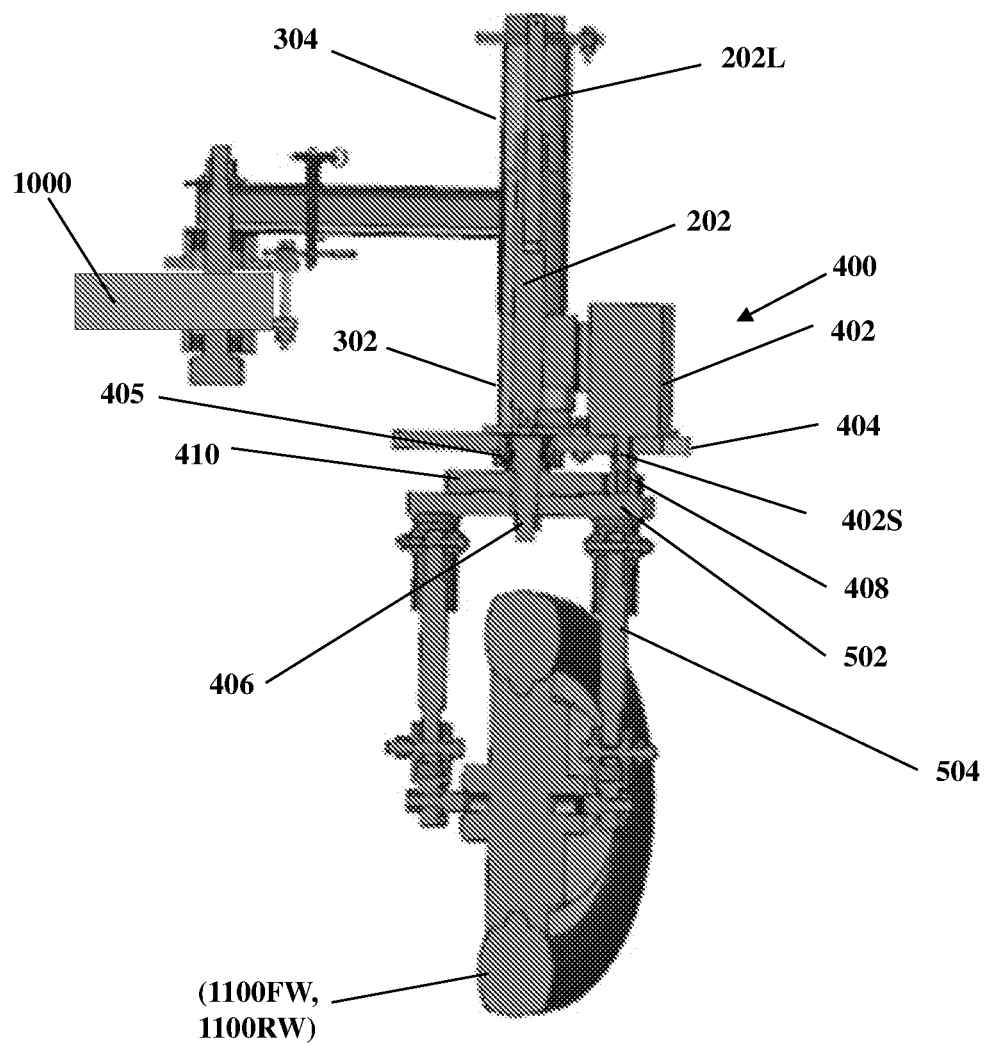
FIG. 12 depicts a cross-sectional view of one of the steering motor coupled to corresponding wheel of the vehicle, according to embodiments as disclosed herein.

Each vertical axle assembly (300) comprises a mounting bracket (301), a stationary lower vertical axle (302), a movable upper vertical axle (304), and an end cover (306), (as shown in FIG. 9 and FIG. 12). The mounting bracket (301) adapted to mount corresponding said linear actuator (202) of the height adjusting system (200) thereon. The end cover (306) adapted to be connected onto a top end of the corresponding movable upper vertical axle (304). The mounting bracket (301) is a separate part or an integral part of the stationary lower vertical axle (302). The final linearly movable member (202L) of each linear actuator (202) of the height adjusting system (200) is adapted to be secured to the end cover (306) of corresponding vertical axle assembly (300). Each vertical axle assembly (300) is adapted to support corresponding wheel (1100F, 1100R) through corresponding rotatable fork (502) and the suspension units (504), (as shown in FIG. 9). The stationary lower vertical axle (302) of each vertical axle assembly (300) and each linear actuator (202) of the height adjusting system (200) are adapted to be mounted onto the mounting bracket (404) through the mounting bracket (301) of the vertical axle assembly (300).

FIG. 9 and FIG. 11 depict one of the steering motor (402) of the steering system (400) coupled to corresponding wheel (1100FW, 1100RW) of the all-terrain utility vehicle (10), according to embodiments as disclosed herein. The steering system (400) is adapted to control steering of each wheel (1100FW) of the all-terrain utility vehicle (10). In an embodiment, the steering system (400) comprises a steering wheel (401W), a steering column (401C), a steering rotary encoder (401E)), a plurality of steering motors ((402) (only one of which is shown in FIG. 9, FIG. 11 and FIG. 12)), a plurality of mounting brackets (404), a plurality of bearings (405), a plurality of steering shafts (406), a plurality of driver gears (408) and a plurality of driven gears (410). The steering wheel (401W) is rotatably connected onto a steering column shaft ((401CS) (as shown in FIG. 14)) of the steering column (401C). The steering wheel (401W) is operated by the operator seated in the operator station (800ST). The steering rotary encoder (401E) is mounted onto the steering column shaft (401CS) of the steering column (401C). The steering rotary encoder (401E) is adapted to monitor and communicate the rotational position of the steering column shaft (401CS) to the master controller unit (802). Each steering motor (402) is mounted on corresponding mounting bracket (404). An output shaft (402S) of each steering motor (402) is rotatably connected to corresponding driven gear 410) through corresponding driver gears (408). Each driver gear (408) is mounted on one end of the output shaft (402S) of corresponding steering motor (402). Each driver gear (408) is rotatably connected to corresponding driven gear (410). Each driver gear (408) drives the driven gear (410) on operation of corresponding steering motor (402) based on instructions sent by the master controller unit (802) to corresponding steering motor (402) in accordance to the input received from the steering rotary encoder (401E). Each driven gear (410) is mounted onto corresponding steering shafts (406). Each driven gear (410) rotates corresponding rotatable fork (502) through corresponding steering shafts (406). Each steering shaft (406) is supported by the mounting bracket (404) through corresponding bearing (405). Each steering shaft (406) is rotatably connected to corresponding bearing (405) and corresponding driven gear (410). Each steering shaft (406) is secured to corresponding rotatable fork (502) by using nuts ((N3), as shown in FIG. 11). Each bearing (405) is disposed inside corresponding mounting bracket (403) to support corresponding steering shaft (406). Each rotatable fork (502) is adapted to rotate corresponding wheel (1100FW, 1100RW) in response to rotation of the driven gear (410) on operation of corresponding steering motor (402). Each steering motor (402) is adapted to rotate the angular direction of the corresponding said rotatable fork (502) through the corresponding steering shaft (406) thereby steering corresponding wheel (1100FW, 1100RW) based on instruction(s) received from the master controller unit (802) in accordance to input sent by said steering rotary encoder (401E) to the master controller unit (802).

Each steering motor (402) is coupled to the corresponding wheel (1100FW, 1100RW) through corresponding rotatable fork (502) and wheel suspension units (504) of the all-terrain utility vehicle (10) and shown in FIG. 11 and FIG. 12. The master control unit (802) is adapted to control steering of each wheel (1100FW, 1100RW) through the corresponding steering motor (402). Each steering motor (402) is adapted to rotate corresponding front wheel (1100FW) through corresponding rotatable fork (502) and corresponding driven gear (410) based on instructions received from the master control unit (802). Each driven gear (410) is driven by the corresponding steering motor (402) whose angle of rotation is controlled by the master control unit (802), where the master control unit (802) is provided in the operator station.

The wheel suspension system (500) adapted to dampen a shock load received by the wheels (1100FW, 1100RW). The wheel suspension system (500) comprises a plurality of rotatable forks (502) and a plurality of suspension units ((504) (as shown in FIG. 11 and FIG. 12.)), where at least two suspension units (504) are positioned between and on either side of corresponding each of rotatable fork (502) and a shaft (1100FWS, 1100RWS) (as shown in FIG. 11 and FIG. 12) of corresponding each of said wheel (1100FW, 1100RW) of all-terrain utility vehicle (10).

Figure 13:
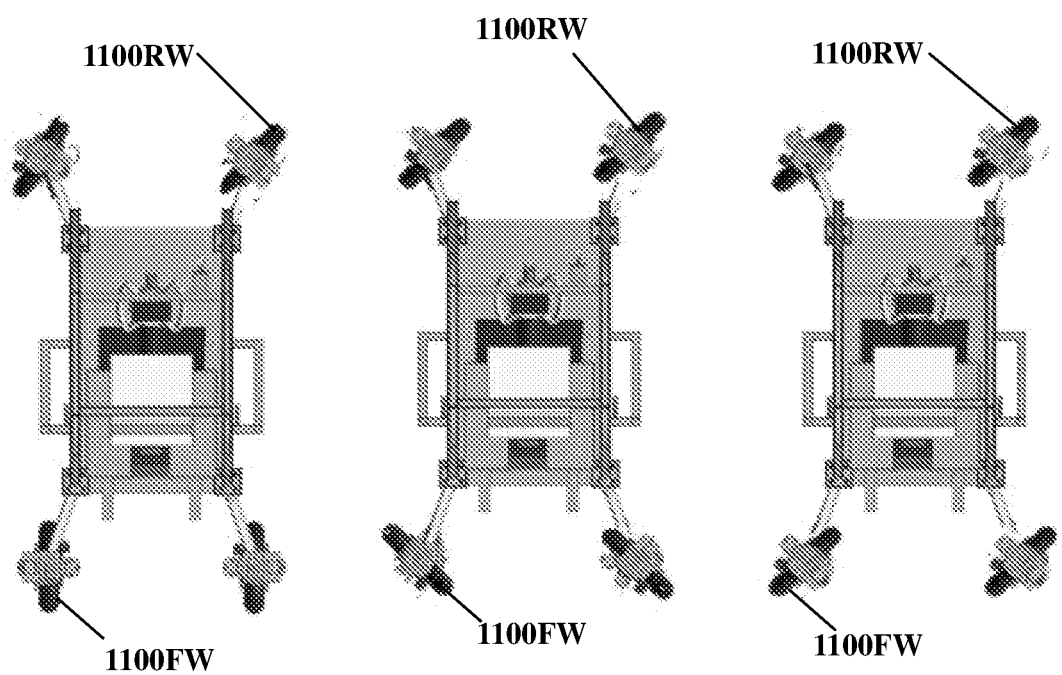
FIG. 13 depicts the wheel orientation for different steering modes proposed for the all-terrain utility vehicle, according to embodiments as disclosed herein.

In another embodiment, the master controller unit (802) is configured to operate the steering system (400) of the all-terrain utility vehicle (10) in one of a two-wheel steering mode, an all-wheel steering mode (including a zero turning radius steering mode) and a crab steering mode (diagonal steering mode) (as shown in FIG. 13). The steering modes can be activated by the operator with a 3 position toggle switches (804 D/804E/804F) defined on the first user control module (804) which is provided on a dashboard or touch screen of the display panel provided in the operator station as shown in FIG. 18. In two-wheel steering mode, the front wheels (1100FW) are steered while maintaining the rear wheels (1100RW) in straight position. In four-wheel steering mode, the front wheels (1100FW and the rear wheels (1100RW) are steered in opposite direction thereby enabling the all-terrain utility vehicle (10) to have minimum turning radius. The master controller unit (802) switches the all-wheel steering mode to the zero turning radius steering mode in which the master controller unit (802) controls the steering motors (402) to turn diagonally located wheels (1100FW, 1100RW) in a same angular direction thereby enabling said all-terrain utility vehicle (10) to have a zero turning radius and stability and enables the vehicle to pivot on its own axis when the angular position of the wheels (1100FW, 1100RW) has reached a threshold angular position when operated in four wheel steering mode based on input from encoders (1204) to the master controller unit (802). The four-wheel steering mode provides better maneuverability for field work to turn in limited space from row to row and at the corners of the field. This increases the field capacity of the all-terrain utility vehicle thereby saving time and fuel. In the crab steering mode, all wheels (1100FW, 1100RW) are steered in same direction thereby moving the all-terrain utility vehicle (10) sideways or diagonally. The crab steering mode is very useful to approach orchard and plantation crops from the side for spraying and harvesting operations allowing a close approach by the vehicle not possible by conventional steering. The master controller unit (802) is configured to steer each wheel (1100FW, 1100RW) independently based on inputs from the first user control module (804) and the steering wheel (401W). Further, the steering input is provided to the master controller unit (802) by using GPS and digital maps when the all-terrain utility vehicle (10) is operated in one of an autonomous mode or a semi-autonomous mode. In another embodiment, the steering input is provided to the master controller unit (802) by using the second user control module (806).

The implement mounting system (600) is adapted to mount the implement (1300) at a center or away from the center of the chassis (1000). The implement mounting system (600) comprises a plurality of implement mounting members (602) and a plurality of rotatable joint assemblies ((604) (as shown in FIG. 15 and FIG. 16), where one end of each implement mounting member (602) is connected to the chassis (1000), and where each rotatable joint assembly (604) is adapted to movably connect the implement (1300) to another end of the corresponding implement mounting member (602). Each rotatable joint assembly is pin joint. It is also within the scope of the invention to provide any other type of rotatable joint for swingably connecting the implement (1300) to the chassis (1000).

The implement position adjusting system (700) comprises at least one first linear actuator (702) and at least one second linear actuator (704) (as shown in FIG. 15 and FIG. 16). The first linear actuator (702) is adapted to be mounted to the chassis (1000). The first linear actuator (702) comprises a final linearly movable member (702L) adapted to be coupled to a front end of the implement (1300). The second linear actuator (704) is adapted to be mounted to the chassis (1000), where the second linear actuator (704) comprises a final linearly movable member (704L) adapted to be coupled to a rear end of the implement (1300). The final linearly movable member (702L) of the first linear actuator (702) of the implement position adjusting system (700) is adapted to move the front end of the implement (1300) in a rotational direction about a horizontal axis setting an angular orientation of the implement towards or away from the ground surface (GS) thereby changing a position of the front end of the implement (1300) when the first linear actuator (702) receives instruction(s) from the master controller unit (802) and while at the same time, the master controller unit (802) activates the second linear actuator (704) to rotate the rear end of the implement (1300) to accommodate the change in position of the front end of the implement (1300). The master controller unit (802) activates the first linear actuator (702) and the second linear actuator (704) based on inputs received from the first user control module ((804) (three position toggle switches on the dashboard) or the second user control module (806). When the vehicle desires to start operations against high value of draft pull The angle of the implement can be inclined with a front dipped downwards to the ground, can provide additional horizontal component of the tractive force being exerted on the implement (1300) by each wheel and reducing the peak torque requirement on the wheel drive motors (1200).

The final linearly movable member (704L) of the second linear actuator (704) of the implement position adjusting system (700) is adapted to move the rear end of the implement (1300) in a rotational direction towards or away with respect to the from the ground surface (GS). Thereby changing the position of the rear end of the implement (1300) when the second linear actuator (704) receives instruction(s) from the master controller unit (802) and while at the same time, the master controller unit (802) activates the first linear actuator (702) to rotate the front end of the implement (1300) to accommodate the change in position of the rear end of the implement (1300). When the vehicle is travelling up a hill gradient with a trailed load, the dipping of the rear of the implement will reduce the hitch height and therefore reduce the de-stabilizing component of the pull force and in increase the stability of the vehicle with its trailed load. This will enable it to climb the gradient safely while making mid-course hitch height corrections. The vertical component of the Soil force W can be also be increased by rotation of the rear Implement towards the ground surface as given in this embodiment with dipping of the rear end of the implement to aid in increasing the tractive force at the wheels of the vehicle. Each first and second linear actuator (702, 704) is one of an electric linear actuator, an electro-magnetic linear actuator, a pneumatic linear actuator and a hydraulic linear actuator.

FIG. 21 depicts a block diagram showing a master controller unit (802) in communication with each linear actuator (202) of the height adjusting system (200), each steering motor (402), each linear actuator (702, 704) of the implement position adjusting system (700), the first user control module (804), the second user control module (806), the wheel drive motor (1200), a steering rotary encoder (401E) of the steering system (400) according to embodiments as disclosed herein. The master controller unit (802) controls the operation of the vehicle by activating at least one of the actuators (202, 702, 704), the steering motor (402) and the wheel drive motor (1200) based on inputs received from at least one of the first user control module (804), the second user control module (806) and sensor module. The master controller unit (802) is contained in the enclosure (801). The master controller unit (802) operates in one of an autonomous guidance mode, a remote guidance mode and manual guidance mode, or a combination thereof. For example, the master controller unit (802) in a combination of autonomous guidance mode and remote guidance mode. In another example, the master controller unit (802) can operate in combination of autonomous guidance mode and manual guidance mode. In another example, the master controller unit (802) can operate in combination of remote guidance mode and manual guidance mode. The vehicle navigation is enhanced by use of digital maps and GPS inputs. In autonomous guidance mode, the master controller unit (802) is adapted to control the steering motors (402) for guiding the vehicle to reach a target location based on the digital map and global positioning inputs received by the master controller unit (802). In remote guidance mode, the master controller unit (802) is adapted to display digital maps on the display unit (806G) of the second user control module (806) The for navigating a remote user for moving the vehicle to reach the target location based on the digital map and global positioning inputs received by the master controller unit (802). In manual guidance mode, the master controller unit (802) is adapted to display at least one digital map on the display unit (401F) positioned on the steering wheel (401W) for navigating user of vehicle to reach the target location based on global positioning inputs received by the master controller unit (802).

FIG. 18 depicts a schematic diagram of a first user control module (804), according to embodiments as disclosed herein. The first user control module (804) in communication with said master controller unit (802). The first user control module (804) comprises a height adjusting control means (804A), a first implement position control means (804B), a second implement position control means (804C), an all-wheel steering control means (804D), a two wheel steering control means (804E) a crab steering control means (804F), a forward direction drive control means (804H) and a reverse direction drive control means (804I). The height adjusting control means (804A) adapted to provide at least one input signal to the master controller unit (802) to adjust the height of the chassis (1000) with respect to the ground surface (GS). The height adjusting control means (804A) is one of a spring loaded switch, spring loaded lever, a spring loaded knob and a spring loaded button, or any other spring loaded means. The first implement position control means (804B) adapted to provide at least one input signal to the master controller unit (802) to adjust the position of the front end of the implement (1300) with respect to the ground surface (GS). The first implement position control means (804B) is one of a spring loaded switch, spring loaded lever, a spring loaded knob and a spring loaded button, or any other spring loaded means. The second implement position control means (804C) adapted to provide at least one input signal to the master controller unit (802) to adjust the position of the rear end of the implement (1300). The second implement position control means (804C) is one of a spring loaded switch, spring loaded lever, a spring loaded knob and a spring loaded button, or any other spring loaded means. The all-wheel steering control means (804D) adapted to provide at least one input signal to the master controller unit (802) to steer the front wheels (1100FW) and the rear wheel (1100RW) in opposite direction or the diagonally located wheels in the same angular direction thereby enabling all-terrain utility vehicle (10) to execute minimum or zero turning radius. The two-wheel steering control means (804E) adapted to provide at least one input signal to the master controller unit (802) to steer the front wheels (1000FW) while maintaining the rear wheels (800W) in straight position. The crab steering control means (804F) adapted to provide at least one input signal to the master controller unit (802) to the plurality of wheels (1100FW, 1100RW) to steer them in a same angular direction). The forward direction drive control means (804H) is adapted to provide input signal with respect to moving the vehicle along a forward direction, to the master controller unit (802). The reverse direction drive control means (804I) is adapted to provide input signal with respect to moving the vehicle along a reverse direction, to the master controller unit (802). The first user control module (804) is wired user control module which is provided on of a dashboard of the vehicle. It is also within the scope of the invention to provide any other types of user control modules for communicating user inputs to the master controller unit (802).

FIG. 19 depicts a schematic diagram of a second user control module (806), according to embodiments as disclosed herein The second user control module (806) in communication with said master controller unit (802) through RF transmitter to the Transceiver unit connected to the master control module (804). The second user control module (806) comprises height adjusting control means (806A), a first implement position control means (806B), a second implement position control means (806C), an all-wheel steering control means (806D), a two wheel steering control means (806E), a crab steering control means (806F), a display unit (806G), a steering and direction control means (806H) and a throttle control means (806I). The height adjusting control means (806A) adapted to provide at least one input signal to the master controller unit (802) to adjust the height of the chassis (1000) with respect to the ground surface (GS). The height adjusting control means (806A) is one of a spring loaded switch, spring loaded lever, a spring loaded knob and a spring loaded button, or any other spring loaded means. The first implement position control means (806B) adapted to provide at least one input signal to the master controller unit (802) to adjust the position of the front end of the implement (1300) with respect to the ground surface (GS). The first implement position control means (806B) is one of a spring loaded switch, spring loaded lever, a spring loaded knob and a spring loaded button, or any other spring loaded means. The second implement position control means (806C) is adapted to provide at least one input signal to the master controller unit (802) to adjust the position of the rear end of the implement (1300) with respect to the ground surface (GS). The second implement position control means (806C) is one of a spring loaded switch, spring loaded lever, a spring loaded knob and a spring loaded button, or any other spring loaded means. The all-wheel steering control means (806D) is adapted to provide at least one input signal to the master controller unit (802) to to steer the front wheels (1100FW) and the rear wheel (1100RW) in opposite direction thereby enabling the all-terrain utility vehicle (10). The two-wheel steering control means (806E) is adapted to provide at least one input signal to the master controller unit (802) to steer the front wheels (1000FW) while maintaining the rear wheels (800W) in straight position). The crab steering control means (806F) adapted to provide at least one input signal to the master controller unit (802) to the plurality of wheels (1100FW, 1100RW) in a same angular direction. The steering direction control means (806H) is at least one input signal to the master controller unit (802) to control the steering motors (402) thereby controlling the steering of the wheels (1100FW, 1100RW) and direction of travel. The steering direction control means (806H) is one of a spring loaded lever and a spring loaded knob, or any other spring loaded means. The throttle control means (806I) is at least one input signal to the master controller unit (802) to control the acceleration of the vehicle. The throttle control means (806I) is one of a spring loaded lever and a spring loaded knob, or any other spring loaded means. The second user control module (806) is a wireless user control module. For example, the second user control module (806) is a radio frequency based user control module. It is also within the scope of the invention to provide any other type of wireless user control modules for providing at least input to the master controller unit (802) for controlling the operability of the vehicle.

The plurality of wheels (1100FW, 1100RW), said plurality of wheels (1100FW, 1100RW) includes a plurality of front wheels (1100FW) and a plurality of rear wheels (1100RW). The plurality of wheel drive motors (1200), where each wheel drive motor (1200) is positioned inside a wheel rim (1100FWR, 1100RWR) of corresponding wheel (1100FW, 1100RW). Each wheel drive motor (1200) is adapted to drive corresponding said wheel (1100FW, 1100RW) based on instructions received from the master controller unit (802). The shaft (1100FWS, 1100RWS) of each of said wheel (1100FW, 1100RW) is a non-rotatable shaft (stationary shaft). FIG. 20 depicts a cross sectional view of wheel (1100FW, 1100RW) and the wheel drive motor (1200) in assembled condition, according to embodiments as disclosed herein The wheel drive motor (1200) comprises a rotor assembly (1202), a brake unit (1204), a stator (1207), a plurality of permanent magnets (1208) attached to the rotor assembly (1202) and a wheel encoder (1206). The brake unit (1204) adapted to be freely mounted onto a wheel shaft ((1100FWS, 1100RWS)) of the corresponding wheel (1100FW, 1100RW). The wheel encoder (1206) is adapted to sense and communicate at least one of rotational speed or position of one of rotor assembly (1200), and wheel hub to the master controller unit (802). Each wheel drive motor (1200) is at least an electric motor. For example, each wheel drive motor (1200) is at least an electric motor such as but not limited to a brushless direct current (BLDC) motor. The brake unit (1204) of each wheel drive motor (1200) is adapted to engage the wheel rim (1100FWR, 1100RWR) of corresponding wheel (1100FW, 1100RW) when the brake unit (1204) is activated by the brake linkage system on engagement of a brake pedal (1504BP) of the all-terrain utility vehicle (10). The master controller unit (802) is adapted to control power supply and speed to at least one of the wheel drive motor (1200) based on input received from the wheel encoder (1206) and inputs for speed from the throttle potentiometer ((1504AT), (as shown in FIG. 14) located in afoot operated accelerator pedal (1504AP). The master controller can control the wheel slip by differentiating between the relative speed of the wheels and directing power to the identified wheels so as to maintain stable movement based on signals from the wheel encoder (1206)

Each brake unit (1204) is freely mounted onto the wheel shaft (1100FWS, 1100RWS) of corresponding wheel (1100FW, 1100RW). The plurality of brake units (1204) are operated on engagement of brake pedal (1504BP) disposed in the operator station (800ST). At least one shaft of each wheel (1100FW, 1100RW) fits into a corresponding suspension fork assembly which is supported by a spring and damper that provide terrain holding and suspension action to dampen shocks due to uneven terrain thereby provide more comfortable ride to the operator (user/driver) seated in the operator station. The master control unit (802) receives wheel speed and location and adjusts their relative speed and power distribution to identified wheels to enable traction and slip control. The wheel tire is mounted on the rim inside of which is fitted the electric BLDC hub motor with an in-built brake system. At the center of the hub motor is fitted the Wheel shaft assembly which support the hub motor. A twin suspension is fitted on either side of the hub Motor and attached at its lower end to the wheel shaft assembly (1100FWS/RWS). The Suspension at its top end is attached to the rotatable fork (502). The electric wheel hub motor drives including their bake systems are mounted within the wheel rim. This provides for a very slim compact and narrow width wheel assembly enabling the vehicle to move within extremely narrow row spacing without disturbance or damage to the crop. This unique feature is critical when operating in wet land or horticulture crops when row spacing can be less than 20 cms. The electric propulsion system to the wheel hub motors enables the construction of a vertical axle assembly with the suspension system steering system and height adjustment system mounted symmetrically one above the other about a vertical axis passing down from the rotatable fork ((502) wheel fork)) to the wheel ground contact. Unlike other prior art where this in-line symmetrical construction of the vertical axle is not fully possible. This provides the vehicle the unique ability of a balanced very narrow vertical axle assembly which enables the vehicle to move within narrow crop row spacing during the crop growth cycle without obstruction or damage to the standing crop. The wheel and hub motors are attached to the rotatable fork ((502) wheel fork)) and steering system uniquely with the help of the suspension (504) in a manner which enables them to turn through 360 degree angle providing very high maneuverability and turning ability. Unlike prior art where the turning angle of the wheels is limited by their assembly and construction. The vertical axles assembly with the wheel hub motors and stepper motor of steering system and linear actuators of height adjustment system are mounted below the chassis which helps to lower the center of gravity of the vehicle considerably and distribute its weight to its wheels more effectively as compared to the prior art. This contributes to the inherent stability and tractive ability of the vehicle.

The driver providing steering input by the steering wheel (401W) guided by display unit (401F) (display screen of computer tablet) mounted on the steering wheel (401W). The movement of the vehicle can be controlled by the accelerator pedal (504AP) and arrested by the brake pedal (1504BP).

In another embodiment, the implement mounting system (600) as shown in FIG. 1 and FIG. 16 is adapted to engage an implement (1300) a coupled under the chassis of the all-terrain utility vehicle (10). The implement hitch system (600) ensures dynamic transfer of force to increase normal load on the wheel (1100 FW and 1100RW). The implement (1300) includes a plurality of implement working members (1302) and a plurality of vertical support members (1304). The implement working members (1302) are attached to vertical supports (1304). The implement (1300) is attached below the chassis (1000) by the implement mounting system (600). The implement mounting system (600) supports the implement (1300) and maintains its angle with respect to the vehicle and soil. The angle of the soil reaction force R acting on the implement cutting edge at G can be resolved into vertical force W and horizontal pull force P (as shown in FIG. 17). The angle of R and therefore the magnitude of the forces W and P can be changed based on the orientation of the implement with respect to the soil, which can be adjusted by the linear actuators (702, 704) of the implement position adjusting system (700). As the soil resistance increases the downward force W also increases. As the implement is mounted below the chassis, this force W is transferred through the linkage and vide the chassis frame to exert a downward force like $R_f$ and $R_r$ on all the vertical axles and wheels so as to increase their traction. This enables the vehicle implement system to generate additional traction from the wheels proportional to the downward force without the need of adding weight to the chassis or wheels. At the start of implement operation, the angle of the implement (1300) is adjusted so that the horizontal component of the propulsion force Pp working against the horizontal component of soil resistance P this helps to reduce the breakout torque for forward movement of the vehicle. Reduced breakout torque will allow the downsizing of the vehicle propulsion system. The depth of the operation of the implement is adjusted by the height adjustment of the chassis vertical linear actuators (202) with respect to the soil and maintained at this depth by the support provided by the all-terrain utility vehicle (10) wheels which follow the soil surface and terrain. Hence this system achieves depth and draft control for the vehicle with its implement without the need of additional complex hydraulic systems. The advantages of the implement mounting system (600) are as follows. Once the implement is hitched the operator can precisely control the depth of the implement by varying the chassis height. Further the wheels of the vehicle act as the ground wheels of the implement and provide terrain following ability to maintain the set depth. If there is a change in soil resistance the draft force component P can be adjusted to the desired wheel slip which is monitored by the wheel motor controller (802) and by adjusting the height of the chassis. Mounting the Implement (1300) below the chassis directs the draft pull to increase the vertical downward component on all the wheels proportionate to the Soil reaction R and improving traction and reducing the need to add dead weight on the wheels. Thus making the vehicle dynamic mass adjustable and reduces the requirement of the vehicle weight to the minimum required and gives it's the ability to increase its pull at minimum slip as the soil resistance increases without any addition of weight or loss of stability due to weight transfer as in other Prior Art examples. When the vehicle desires to start operations against high value of draft pull. The angle of the implement (1300) can be inclined with a front implement dip which can increase the horizontal component of the vehicle pull force which overcomes soil resistance force P thus reducing the peak torque requirement on the power unit.

The master controller unit (802) is adapted to provide at least one of semi-autonomous and autonomous guidance to the vehicle based on inputs received from the external information inputs like GPS positioning, digital maps and plant and soil data for precision operations with implements in the field.

The electric energy pack (1400) as shown in FIG. 14 and enclosure ((801) (power electronics module enclosure)) is provided below the operator seat (1506) of the vehicle. A steering support assembly is adapted to support the steering column (401C) of the steering system (400). The operator seat (1506) is mounted above the electric energy pack (1400) and power electronics module. The Steering support assembly framework is supported by the canopy roll over protector (1502) (roll over frame)) and also contains the steering pivot support and a steering adjusting bracket (401G) which provide the means of steering angular adjustment. The steering hub and dashboard support the display unit (401F) of the operator interface on below which is attached the steering wheel (401W). The display unit (401F) is fitted at the center of steering hub so that it is easily visible at the center of the steering wheel (401W) and can be accessed by the driver. The operator will be seated on the operator seat (1506) and control the vehicle direction and propulsion by means of the steering wheel (401W), the foot accelerator pedal (1504AP) and the foot operated brake pedal (1504BP) on the foot board (.The rotation of the steering wheel (401W) is picked up by the steering rotary encoder (401E) fitted on the steering column shaft (401CS) and conveyed to the master controller (802) in the power electronics box (800). The throttle potentiometer (1504AT) adapted to monitor and communicate a throttle position of the accelerator pedal (1504AP) to the master controller unit (802). The electric energy storage batteries and motor drivers contained in the battery and power electronics box provide electric energy to the BLDC hub motors and steering stepper motors and linear actuators and provide commands to follow the driver input signals regarding the propulsion received from the throttle potentiometer (1504AT) in the accelerator pedal (1504AP) mounted on a foot board (800F), (as shown in FIG. 14) and angular direction of the vehicle received from the rotary encoder mounted on the steering wheel assembly. The remote RF handheld device is detachable from the dashboard (804) mounting assembly. The vehicle control and power electronics package is contained within the enclosure ((801) (power electronics module enclosure)) can receive signals from the cellular network to locate the vehicle on a digital map displayed by the display unit (401F) and remote control unit (806) and used to guide the operator to direct the vehicle accurately as per the digital map in either of the above mentioned two control modes.

The master controller unit (802) controls all wheel propulsion with onboard control hardware and software to monitor wheel speed, slip and adjust wheel speed during turning of the outer and inner wheels to achieve differential speed for smooth turning. All wheel steering which directs the propulsion wheels to turn with respect to each other and achieve three modes of steering. The master controller unit can operate in three modes of operator riding, remote control and autonomous map guidance due to its function being essentially electronic and electrical in control.

The below table-1 depict simulation test results showing the effect of adjustments in the position of swing arm (102) with respect to swing arm position defining member (106A, 106B) to achieve adjustment in wheel base and corresponding wheel track of the vehicle when the vehicle is operated on forward slope and side slopes with the experimental range from 0 degrees to 30 degrees

TABLE 1

Operation on Forward and Side Slopes

OPERATION ON FORWARD SLOPES

| Position | wheel base | wheel track | 10 deg slope | 15 deg slope | 20 deg slo | 25 deg slope | 30 deg slope |
|---|---|---|---|---|---|---|---|
| hole 1 | 1250.82 mm | 1494.88 mm | yes | no * | | no | no |
| hole 2 | 1479.94 mm | 1458.41 mm | yes | yes | yes | yes | no |
| hole 3 | 1687.69 mm | 1352.56 mm | yes | yes | yes | yes | no |
| hole 4 | 1852.56 mm | 1187.69 mm | yes | yes | yes | yes | no |
| hole 5 | 1958.41 mm | 979.95 mm | yes | yes | yes | yes | up to 10 m |

TABLE 1-continued

| | | Operation on Forward and Side Slopes | | | | | |
|---|---|---|---|---|---|---|---|
| hole 6 | 1994.88 mm | 749.66 mm | yes | yes | yes | yes | up to 10 m |

OPERATION ON A SIDE SLOPES

| Position | wheel base | wheel track | 10 deg side slope | 20 deg side slope | 30 deg side slope |
|---|---|---|---|---|---|
| hole 1 | 1250.82 mm | 1494.88 mm | stable | stable | unstable |
| hole 2 | 1479.94 mm | 1458.41 mm | stable | stable | unstable |
| hole 3 | 1687.69 mm | 1352.56 mm | stable | stable | tend to roll over |
| hole 4 | 1852.56 mm | 1187.69 mm | stable | unstable * | tend to roll over |
| hole 5 | 1958.41 mm | 979.95 mm | stable | roll over | rolled over |
| hole 6 | 1994.88 mm | 749.66 mm | stable | roll over | rolled over |

NOTE
* The limitation to movement in these conditions was overcome by reducing the Chassis height by 100 mm for the vehicle From the above table 1, it is clearly evident that for longitudinal slopes in experimental ranges of 10 degrees to 30 degrees, the climbing ability of the vehicle is improved by increasing the wheel base of the vehicle by changing the position of swing arm (102) with respect to one of the plurality of swing arm locking portions ((106A1, 106BL) (holes)) defined on the swing arm position defining member (106A, 106B)), in this embodiment up to a 25 to 30 degree forward slope. Further, when limitation of stability and traction were encountered, further improvement was possible by lowering the chassis height with the linear actuators (202) of the height adjusting system (200) and therefore the vehicle center of gravity (CG) helping mobility of the vehicle up the slope. During operation of the vehicle on side slopes in the experimental range from 10 degrees to 30 degrees the vehicle stability in this embodiment was improved by increasing the wheel track by changing the position of swing arm (102) with respect to one of the plurality of swing arm locking portions ((106A1, 106BL) (holes)) defined on the swing arm position defining member (106A, 106B). Further, when a limitation of stability was encountered further improvement was possible by lowering the chassis height with the linear actuators (202) of the height adjusting system (200) and therefore the vehicle center of gravity (CG) helping mobility of the vehicle on the side slope. Therefore, these simulation test results validate the unique benefits of the embodiment which provides the feature of a scalable chassis with respect to wheelbase, wheel track and height adjustment.

Figure 22A:
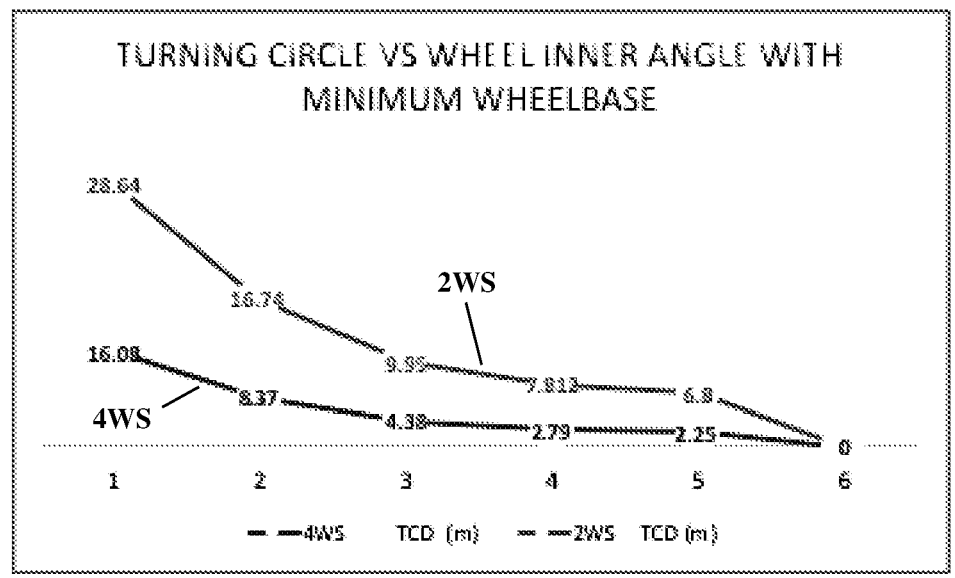
FIG. 22a depicts graph plot of turning circle reduction with wheel angle at minimum wheelbase for two-wheel steering mode and four-wheel steering mode, according to embodiments as disclosed herein.
Figure 22B:
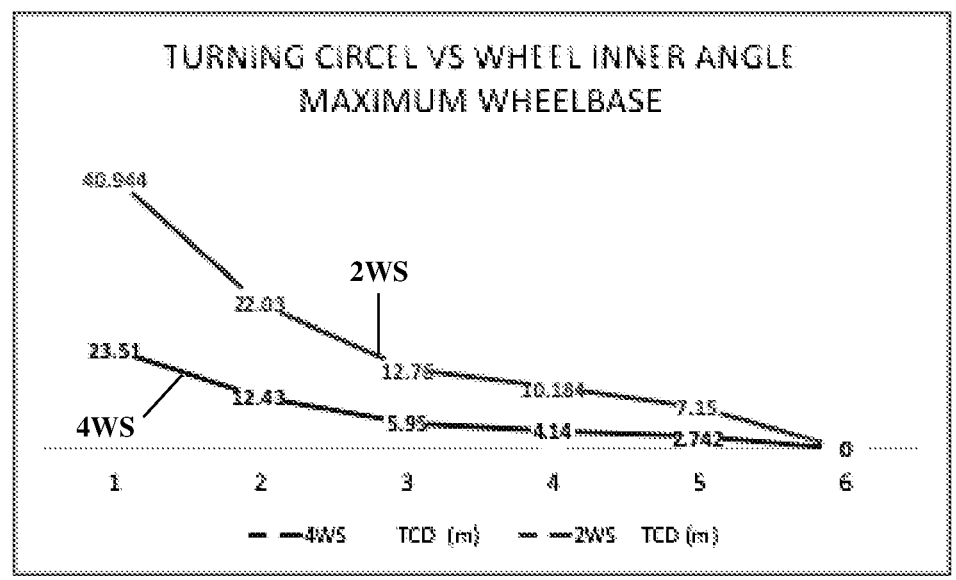
FIG. 22b depicts graph plot of turning circle reduction with wheel angle at maximum wheelbase for two-wheel steering mode and four-wheel steering mode, according to embodiments as disclosed herein.

The below table-2 and as shown in the graph in FIG. 22a and FIG. 22b depicts simulation test results showing turning circle diameter (TCD) for corresponding adjusted wheel base and wheel track of the vehicle when operated in the two wheel steering mode and the four wheel steering mode.

TABLE 2

Impact of change in Wheelbase and Wheel track on TCD
ATUV Steering Data

| Wheel Track | Wheel Inner angle | Wheel Outer angle | 4WS TCD (m) | ZWS TCD (m) | Remarks |
|---|---|---|---|---|---|
| Wheelbase (Min) | | | | | |
| 1250.81 | 1494.87 | 10 | 6.2658 | 16.08 | 28.64 | Stable Turn |
| 1250.81 | 1494.87 | 20 | 14.096 | 8.37 | 16.74 | Stable Turn |
| 1250.81 | 1494.87 | 30 | 18.44 | 4.38 | 9.95 | Stable Turn |
| 1250.81 | 1494.87 | 40 | 21.8 | 2.79 | 7.812 | Stable Turn |
| 1250.81 | 1494.87 | 45 | 23.2 | 2.25 | 6.8 | Stable Turn |
| ZERO turning radius | | 45 | 23.2 | 0 | 0 | Diagonally located wheels in the same direction—stable up to 15 kmph |
| Wheelbase (Max) | | | | | |
| 1994.5273 | 749.4836 | 10 | 9.378 | 23.51 | 40.944 | stable turn |
| 1994.5273 | 749.4836 | 20 | 17.67 | 12.43 | 22.03 | stable turn |
| 1994.5273 | 749.4836 | 30 | 25.062 | 5.95 | 12.76 | Unstable at higher speeds |
| 1994.5273 | 749.4836 | 40 | 31.68 | 4.14 | 10.184 | Unstable at higher speeds |
| 1994.5273 | 749.4836 | 45 | 34.74 | 2.742 | 7.15 | Unstable at higher speeds |
| ZERO turning radius | | 45 | 23.2 | 0 | 0 | Diagonally located wheels in the same direction—stable below 10 kmph |

From the above table 2, it is clearly evident that the vehicle exhibited an average of about 50 percent reduction of turning circle diameter (TCD) when operating in four wheel steering mode (4WS) when compared to two wheel steering mode (2WS) for the same wheel base and steering angle of the wheel. Further, the vehicle demonstrates greater stability and shorter Turning Circle Diameter (TCD) of 30~50 percent between the setting of maximum wheel base and the shortest wheel base. Further, when turning speed is a limitation the shorter wheelbase and lower chassis height gives more stability on the turn. The vehicle exhibited excellent maneuverability right down to a minimum turning radius. The zero turning radius is possible with the wheel on the diagonally located wheels being turned in the same directions as a special case of 4 wheel steering while turning wheels at about 5 degrees.

Figure 23:
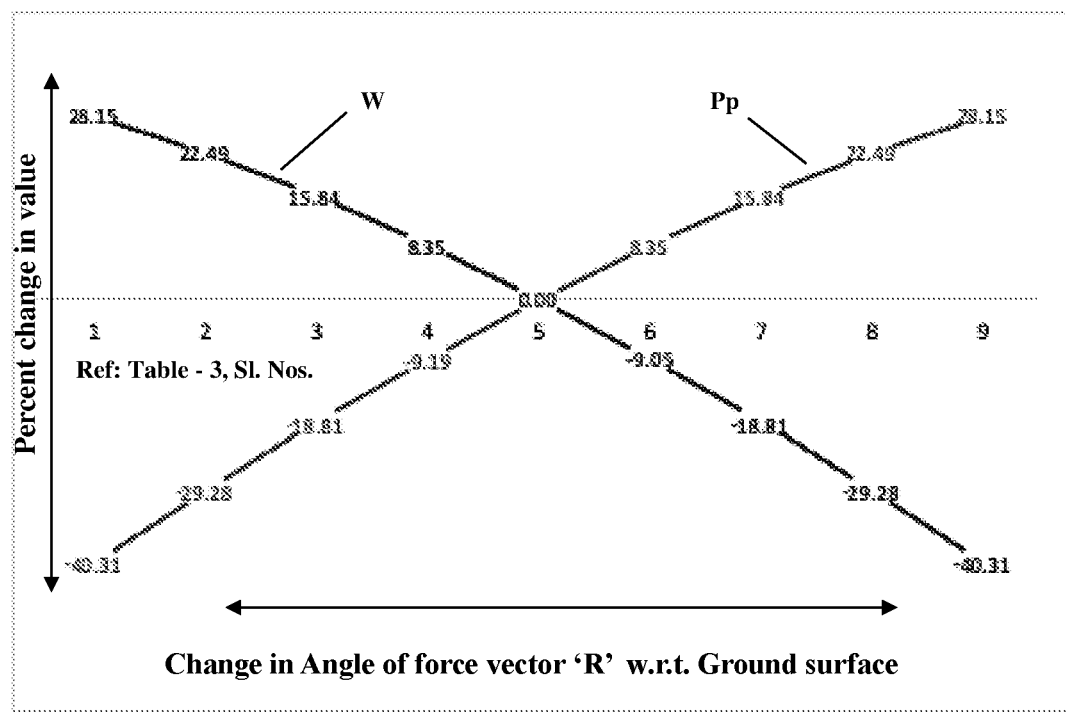
FIG. 23 depicts impact of adjustment in orientation of implement with respect to ground surface, according to embodiments as disclosed herein.

The below table-3 and in the graph as shown in the FIG. 23 depicts simulation test results showing orientation of implement with respect to ground surface and corresponding weight vector W and forward pull vector (Pp).

TABLE 3

Impact of change in Implement angle on Force Vectors

| Sl. No | Angle of Force deg | Soil/pull Force Kgf | Sine of angle | Cosine of Angle | Vector W (Kgf) | Vector Pp (Kgf) | Percent change W | Percent change Pp |
|---|---|---|---|---|---|---|---|---|
| 1 | 65 | 150 | 0.906 | 0.422 | 135.9 | 63.3 | 28.15 | −40.31 |
| 2 | 60 | 150 | 0.866 | 0.5 | 129.9 | 75 | 22.49 | −29.28 |
| 3 | 55 | 150 | 0.819 | 0.574 | 122.85 | 86.1 | 15.84 | −18.81 |
| 4 | 50 | 150 | 0.766 | 0.642 | 114.9 | 96.3 | 8.35 | −9.19 |
| 5 | 45 | 150 | 0.707 | 0.707 | 106.05 | 106.1 | 0.00 | 0.00 |
| 6 | 40 | 150 | 0.643 | 0.766 | 96.45 | 114.9 | −9.05 | 8.35 |
| 7 | 35 | 150 | 0.574 | 0.819 | 86.1 | 122.9 | −18.81 | 15.84 |
| 8 | 30 | 150 | 0.5 | 0.866 | 75 | 129.9 | −29.28 | 22.49 |
| 9 | 25 | 150 | 0.422 | 0.906 | 63.3 | 135.9 | −40.31 | 28.15 |

From the above table-3, it is clearly evident that vehicle demonstrated that as the angle of the Implement orientation with respect to the ground surface was changed through a range of 0 degrees to 20 degrees from a starting nominal angle of 45 degrees up to 65 degrees. The weight vector W can be increased by about 28% for the particular embodiment used in the test. This being achieved by dipping the implement rear end towards the ground surface. Thus increasing the wheel traction by transfer of this soil induced vector downward through the chassis to the wheels. Further, the vehicle demonstrated that as the angle of the front of the implement orientation with respect to the ground surface was changed through a range of 0 degrees to 20 degrees from a starting nominal angle of 45 degrees down to 25 degrees. The forward pull vector (Pp) can be increased by about 28% for the particular embodiment used in the test. This being achieved by dipping the implement towards the front and towards the ground surface and therefore increasing the horizontal component of the pull exerted by the vehicle on the implement. Thus, making better use of the draft pull force being generated by the vehicle to move the implement. The operator of the vehicle has therefore the unique facility by this embodiment to adjust the response of the vehicle to the soil and dynamic forces to operator advantage.

FIG. 24 depicts a flowchart indicating a method (20) for adjusting wheel track and wheelbase of the all-terrain utility vehicle (10), according to embodiments as disclosed herein. The method (20) for adjusting wheel track and wheelbase of an all-terrain utility vehicle (10) is disclosed herein. At step (22), the method (20) comprises unlocking each swing arm (102) from a corresponding swing arm position defining member (106A, 106B) by removing each locking member (108) from a swing arm locking portion (106AL, 106BL) of the corresponding swing arm position defining member (106A, 106BL).

At step (24), the method (20) comprises rotating each swing arm (102) to a predefined position with respect to the corresponding swing arm position defining member (106A, 106B), and locking each swing arm (102) to corresponding swing arm position defining member (106A, 106B) by inserting each locking member (108) into one of plurality of another swing arm locking portions (106AL, 106BL) of the swing arm position defining member (106A, 106B) thereby adjusting a wheel track and a corresponding wheel base of the all-terrain utility vehicle (10).

Further, the method (20) includes pivotably connecting, by a pivot assembly (104A, 104B), one end of each swing arm (102) to the chassis (1000) and connecting another end of each swing arm (102) to a corresponding vertical axle (304).

Furthermore, the method step of pivotably connecting, by a pivot assembly (104A, 104B), one end of each swing arm (102) to the chassis (1000), includes, disposing a top bearing (104AR, 104BR) inside a top mounting bracket (104AT, 104BT) of each pivot assembly (104A, 104B); disposing a bottom bearing (104AS, 104BS) inside a bottom mounting bracket (104AB, 104BB) of each pivot assembly (104A, 104B); pivotably connecting, by a pivot pin (104AP, 104BP), each swing arm (102) to the chassis (1000) through corresponding said bearings (104AR, 104BR, 104AS, 104BS) of corresponding each pivot assembly (104A, 104B) by inserting the pivot pin (104AP, 104BP) into the bearings (104AR, 104BR) and corresponding the swing arm (102); and securing each swing arm (102) to corresponding pivot pin (104AP, 104BP) by using fasteners (W, N2), where said fastener (W, N2) is a nut (N2) and washer (W).

Further, the method (20) includes, immediately positioning each swing arm position defining member (106A, 106B) above the top mounting bracket (104AT, 104BT) of corresponding pivot assembly (104A, 104B).

Further, the method (20) includes, securing each swing arm position defining member (106A, 106B), and corresponding top mounting bracket (104AT, 104BT) and the corresponding bottom mounting bracket (104AB, 104BB) of each pivot assembly (104A, 104B) to the chassis (1000) by using fasteners (B1, N1), where said fasteners (B1, N1) is a bolt (B1) and nut (N1).

FIG. 25 depicts a flowchart indicating a method (30) for adjusting wheelbase of the all-terrain utility vehicle (10), according to embodiments as disclosed herein. The method (30) for adjusting wheelbase of the all-terrain utility vehicle (10) is disclosed herein. At step 32, the method (30) comprises unlocking each swing arm (102) from a corresponding first swing arm position defining member (106A) by removing each locking member (108) from a swing arm locking portion (106AL) of the first swing arm position defining member (106A).

At step 34, the method (30) comprises, removing each swing arm (102) from corresponding first pivot assembly (104A) by dis-engaging each swing arm (102) from a pivot pin (104AP) of corresponding first pivot assembly (104A).

At step 36, the method (30) comprises, securing each swing arm (102) to a pivot pin (104BP) of corresponding second pivot assembly (104B) thereby adjusting the wheel base of the all-terrain utility vehicle (10), where each second pivot assembly (104B) is inline and spaced away from corresponding first pivot assembly (104A).

Further, the method (30) comprises pivotably connecting, by a pivot assembly (104A, 104B), one end of each swing arm (102) to the chassis (1000) and connecting another end of each swing arm (102) to a corresponding vertical axle (304).

The method step of pivotably connecting, by a pivot assembly (104A, 104B), one end of each swing arm (102) to the chassis (1000) includes disposing a top bearing (104AR, 104BR) inside a top mounting bracket (104AT, 104BT) of each pivot assembly (104A, 104B); disposing a bottom bearing (104AS, 104BS) inside a bottom mounting bracket (104AB, 104BB) of each pivot assembly (104A, 104B; pivotably connecting, by a pivot pin (104AP, 104BP), each swing arm (102) to the chassis (1000) through corresponding said bearings (104AR, 104BR, 104AS, 104BS) of corresponding each pivot assembly (104A, 104B) by inserting the pivot pin (104AP, 104BP) into said bearings (104AR, 104BR) and corresponding said swing arm (102); and securing each swing arm (102) to corresponding pivot pin (104AP, 104BP) by using fasteners (W, N2), where said fastener (W, N2) is a nut (N2) and washer (W).

FIG. 26 depicts a flowchart indicating a method (40) for adjusting height of the chassis (1000) of the all-terrain utility vehicle (10), according to embodiments as disclosed herein. The method (40) of adjusting height of the chassis (1000) of an all-terrain utility vehicle (10) is disclosed herein. At step 42, the method (40) comprises receiving, by a master controller unit (802), at least one input from a height adjusting control means of one of a first user control module (804) or a second user control module (806) or a sensor module.

At step 44, the method (40) comprises, moving, by a final linearly movable member (202L) of each linear actuator (202) of a height adjusting system (200), a movable upper vertical axle (304) with respect to a stationary lower vertical axle (302) of corresponding vertical axle assembly (300) in a telescopic manner thereby raising or lowering the chassis (1000) with respect to a ground surface (GS) to change a height of the chassis (1000) with respect to said ground surface (GS) when said linear actuators (202) receives instruction(s) from said master controller unit (802) in accordance to inputs sent by one of said first user control module (804) or the second user control module (806) or the sensor module to the master controller unit (802).

Further, the method (40) comprises mounting each linear actuator (202) on a mounting bracket (301), where the mounting bracket (301) is a separate part or an integral part of said stationary lower vertical axle (302. Further, the method (40) comprises securing the final linearly movable member (202L) of each linear actuator (202) to an end cover (306) of corresponding vertical axle assembly (300). Furthermore, the method (40) comprises securing each end cover (306) to a top end of corresponding movable upper vertical axle (304).

Further, the method (40) comprises coupling each movable upper vertical axle (304) to the chassis (1000) by connecting one end of corresponding swing arm (102) to the movable upper vertical axle (304) and pivotably connecting another end of corresponding swing arm (102) to the chassis through corresponding pivot assembly (104A or 104B); and coupling each stationary lower vertical axle (302) to corresponding wheel (1100FW, 1100RW) of the all-terrain utility vehicle (10) through corresponding mounting bracket (404), rotatable fork (502) and suspension unit (504).

FIG. 27 depicts a flowchart indicating a method (50) for adjusting position of an implement (1300) coupled to the all-terrain utility vehicle (10), according to embodiments as disclosed herein. At step (52), the method (50) includes, receiving, by a master controller unit (802), at least one input from a first implement position control means (804B, 806B) of one of a first user control module (804) or a second user control module (806), or a sensor module.

At step 54, the method (50) includes moving, by a final linearly movable member (702L) of at least one first linear actuator (702), a front end of said implement (1300) in a direction towards or away with respect to a ground surface (GS) thereby adjusting a position of the front end of said implement (1300) when said first linear actuator (702) receive instruction(s) from the master controller unit (802) and while at the same time, rotating by the second linear actuator (704), the rear end of the implement (1300) on receiving instruction from the master controller unit (802) thereby accommodating the change in position of the front end of the implement (1300), in accordance to inputs sent by one of the first user control module (804) or the second user control module (806) or the sensor module, to the master controller unit (802).

Furthermore, the method (50) includes receiving, by the master controller unit (802), at least one input from a second implement position control means (804C, 806C) of one of the first user control module (804) or the second user control module (806), or the sensor module.

Further, the method (50) comprises moving, by a final linearly movable member (704L) of at least one second linear actuator (704), a rear end of the implement (1300) in a direction towards or away with respect to a ground surface (GS) thereby changing a position of the rear end of the implement (1300) when the second linear actuator (704) receive instruction(s) from the master controller unit (802) and while at the same time, rotating by the first linear actuator (702), the front end of the implement (1300) on receiving instruction from the master controller unit (802) thereby accommodating the change in position of the rear end of the implement (1300), in accordance to inputs sent by one of the first user control module (804) or the second user control module (806) or the sensor module, to the master controller unit (802).

Further, the method (50) includes connecting one end of each implement mounting member (602) to a chassis (1000); movably connecting, by each rotatable joint assembly (604), the implement (1300) to another end of each implement mounting member (602) thereby swingably mounting the implement (1300) to the chassis (1000); mounting the first and second linear actuator (702, 704) to the chassis at predetermined locations; coupling the final linearly movable member (702L) of the first linear actuator (702) to the front end of the implement (1300); and coupling the final linearly movable member (704L) of the second linear actuator (704) to the rear end of said implement (1300).

The technical advantages of the all-terrain utility vehicle (10) are as follows. The electric energy pack provides energy for propulsion can be backed up with brake regeneration and solar roof power conversion. Auxiliary remote electric power to the implements provides flexibility for location of implement working members. The steering system and the master control unit provides three steering modes and operation with minimum slip and optimum use of tractive power available for maximum mobility and maneuverability in varied terrain and field conditions. The vehicle represents a flexible platform with a scalable chassis which can be adjusted for its track width, wheelbase, height and orientation with respect to the ground surface and implement configuration. Change in wheel track allows the machine to align itself to different crop planting practices in terms of row spacing and width of the implement. Height can be adjusted on the go for varying crop heights and implement sizes. Vertical axles present the minimum obstruction to travel between the rows of the crop thus giving the ability to adapt to multiple crop conditions in different roles without need to change the machine or carryout modification. The positional adjustment of the implement makes it possible to orient the implement with respect to the soil surface and maintain the depth of operation irrespective of the undulating terrain. This also makes it possible to change the horizontal and vertical soil force components to enable minimum break out load and maximize traction during operation from all its drive wheels. This being possible without addition or removal of weight to the vehicle or providing ground wheels for the implement. The use of individual wheel hub motors enables the controller to sense the relative wheel revolutions and slip of the wheels. The controller can then take action to increase the traction and power to the non-slipping wheels by increasing downward force by the linear actuators and reducing power loss to the slipping wheels. The hub motors being mounted directly on the wheels without any transmission loss will make it possible to operate with a very high efficiency of energy usage and greater reliability with minimum loss of effort. The encoders contained in the wheel drive motors provide signals to the Master controller thereby communicating the sensed speed of the wheels. The mounting of the implement below the frame, along with lower located wheel motors provides additional downward force on the wheels and ensures low centre of gravity and terrain hugging ability adding to the stability of the all-terrain utility vehicle. All wheel steering provides small to zero turning radius which will make it possible to operate in small farm plots with minimum turning time losses and minimum turning space. Crab (diagonal) movement will allow the vehicle to approach to the side of plants and trees for spraying, plant care and harvesting.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modifications within the spirit and scope of the embodiments as described herein.

We claim:

1. An all-terrain utility vehicle comprising:
    a plurality of vertical axle assemblies, each including a stationary lower vertical axle and a movable upper vertical axle;
    a height adjusting system that includes a plurality of linear actuators, each including a final linearly movable member coupled to corresponding said movable upper vertical axle;
    a master controller unit coupled to each of said linear actuator of said height adjusting system; and
    a wheel track and wheelbase adjusting system, including:
        a plurality of pivot assemblies, each being positioned on a chassis of said all-terrain utility vehicle;
        a plurality of swing arms, wherein one end of each of said swing arm is pivotably connected to said chassis through corresponding said pivot assembly and another end of each of said swing arm is connected to corresponding said movable upper vertical axle;
        a plurality of swing arm position defining members, each being coupled to said chassis; and
        a plurality of locking members, each securing a corresponding one of the plurality of swing arms to a corresponding one of the plurality of swing arm position defining members, wherein:
        said final linearly movable member of each of said linear actuator moves corresponding said movable upper vertical axle with respect to said stationary lower vertical axle in a telescopic manner thereby raising or lowering said chassis with respect to a ground surface to change a height of said chassis with respect to said ground surface when said linear actuators receives instruction(s) from said master controller unit; and
        each of said linear actuator is one of:
            an electric linear actuator,
            an electro-magnetic linear actuator,
            a pneumatic linear actuator, and
            a hydraulic linear actuator.

2. The all-terrain utility vehicle as claimed in claim 1, wherein:
    said plurality of pivot assemblies of said wheel track and wheel base adjusting system includes a plurality of first pivot assemblies and a plurality of second pivot assemblies, wherein each of said first pivot assembly is in-line and spaced away from corresponding said second pivot assembly;
    said plurality of swing arm position defining members of said wheel track and wheel base adjusting system includes a plurality of first swing arm position defining members and a plurality of second swing arm position defining members, wherein each of said first swing arm position defining member is in-line and spaced away from corresponding said second swing arm position defining member;
    each of said first and second swing arm position defining member defines a plurality of swing arm locking portions; and
    each of said first and second pivot assembly includes:
        a top mounting bracket positioned on a corresponding portion of said chassis;
        a bottom mounting bracket positioned on another corresponding portion of said chassis;
        a top bearing disposed inside said top mounting bracket;
        a bottom bearing disposed inside said bottom mounting bracket; and
        a pivot pin that pivotably connects corresponding said swing arm to said chassis through corresponding said bearings.

3. The all-terrain utility vehicle as claimed in claim 2, wherein:
    each of said swing arm is—pivotably connected to said chassis through corresponding one of said first pivot assembly or said second pivot assembly thereby adjusting a wheel base of said all-terrain utility vehicle;
    a portion of each of said locking member is received by one of said plurality of swing arm locking portions of corresponding one of said first swing arm position defining member or said second swing arm position defining member thereby adjusting a wheel track and corresponding wheel base of said all-terrain utility vehicle;
    each of said swing arm position defining member is positioned above said top mounting bracket of corresponding said pivot assembly;
    each of said swing arm position defining member, and said top mounting bracket and said bottom mounting bracket of corresponding said pivot assembly are secured to said chassis by using fasteners, wherein said fasteners is a bolt and nut; and
    each of said swing arm is secured to corresponding said pivot pin by using fasteners, wherein said fastener is a nut and washer.

4. The all-terrain utility vehicle as claimed in claim 1, wherein:
    each of said vertical axle assembly includes:
        an end cover connected onto a top end of corresponding said movable upper vertical axle; and a mounting bracket, wherein said mounting bracket mounts corresponding said linear actuator of said height adjusting system thereon;

said mounting bracket is a separate part or an integral part of said stationary lower vertical axle; and said final linearly movable member of each of said linear actuator of said height adjusting system is secured to said end cover of corresponding said vertical axle assembly.

5. The all-terrain utility vehicle as claimed in claim 4, wherein:

said all-terrain utility vehicle includes:
- a plurality of wheel, said plurality of wheels includes a plurality of front wheels and a plurality of rear wheels;
- a plurality of wheel drive motors, wherein each of said wheel drive motor is positioned inside a wheel rim of corresponding said wheel; and
- a wheel suspension system, wherein said wheel suspension system dampens a shock load received by said wheels, wherein said wheel suspension system includes a plurality of rotatable forks and a plurality of suspension units, wherein at least two of said suspension units are positioned between and on either side of corresponding each of said rotatable fork and a shaft of corresponding each of said wheel of said vehicle;

each of said wheel drive motor drives corresponding said wheel based on instructions received from said master controller unit;

each of said vertical axle assembly supports corresponding said wheel through corresponding said rotatable fork and said suspension units; and said shaft of each of said wheel is a non-rotatable shaft.

6. The all-terrain utility vehicle as claimed in claim 5, wherein:

each of said wheel drive motor includes:
- a rotor assembly;
- a brake unit freely mounted onto said shaft of corresponding said wheel; and
- a wheel encoder, wherein said wheel encoder senses and communicates at least one of rotational speed or position of one of said rotor assembly and a wheel hub of said wheel to said master controller unit;

each of said wheel drive motor is at least an electric motor;

said brake unit engages said wheel rim of corresponding said wheel on engagement of a brake pedal of said all-terrain utility vehicle;

said vehicle includes a throttle potentiometer, wherein said throttle potentiometer monitors and communicates a throttle position of an accelerator pedal to said master controller unit;

said master controller unit controls speed and power supply to at least one of said wheel drive motor based on input received from said wheel encoders and said throttle potentiometer; and said master controller unit controls wheel slip by differentiating between the relative speed of said wheels and directing power to said identified wheels thereby maintaining stable movement of said all-terrain utility vehicle based on signals received from said wheel encoders.

7. The all-terrain utility vehicle as claimed in claim 6, wherein:

said all-terrain utility vehicle includes a steering system that includes:
- a steering wheel rotatably connected to a steering column shaft;
- a steering rotary encoder that monitors and communicates a rotational position of said steering column shaft to said master controller unit;
- a plurality of steering motors, each being coupled to said master controller unit;
- a plurality of mounting brackets, each mounting thereon a corresponding one of said plurality of steering motors;
- a plurality of bearings, each being disposed inside a corresponding one of said plurality of mounting brackets;
- a plurality of steering shafts, wherein one end of each of said steering shafts is rotatably connected to corresponding said mounting bracket through corresponding said bearing, and another end of each of said steering shafts is secured to corresponding rotatable fork of said wheel suspension system;
- a plurality of driver gears, each being mounted onto an output shaft of a corresponding one of said plurality of steering motors; and
- a plurality of driven gears, each being rotatably connected to a corresponding one of said plurality of driver gears and being mounted onto a corresponding one of said plurality of steering shafts;

said stationary lower vertical axle of each of said vertical axle assembly and each of said linear actuator of said height adjusting system are mounted onto corresponding said mounting bracket through said mounting bracket of said vertical axle assembly;

each of said steering motor rotates corresponding said rotatable fork through corresponding said driver gear, said driven gear and said steering shaft thereby steering corresponding said wheel based on instruction(s) received from said master controller unit in accordance to input sent by said steering rotary encoder to said master controller unit;

each of said movable upper vertical axle, corresponding said steering motor, corresponding said rotatable fork, corresponding said suspension units and corresponding said wheel drive motor are positioned in a layer by layer configuration;

each of said vertical axle assembly, corresponding said steering shaft and corresponding said wheel are coplanar;

an axis of each of said steering shaft and said shaft of corresponding said steering motor is perpendicular to an axis of corresponding said wheel shaft and said rotor assembly of corresponding said wheel drive motor;

each of said steering shaft is parallel and spaced away from said shaft of corresponding said steering motor;

each of said steering shaft is perpendicular to corresponding said rotatable fork; and each of said rotatable fork is parallel and spaced away from corresponding said mounting bracket.

8. The all-terrain utility vehicle as claimed in claim 7, wherein:

said master controller unit operates said steering system in one of a two-wheel steering mode, an all-wheel steering mode and a crab steering mode (diagonal steering mode), wherein said all-wheel steering mode includes a zero turning radius steering mode;

said master controller unit in said two-wheel steering mode, activates corresponding said steering motors located above said front wheels therein to steer said front wheels while maintaining said rear wheels in a straight position;

said master controller unit in said all-wheel steering mode, activates said plurality of steering motors to steer said front wheels and said rear wheel in opposite direction thereby enabling said all-terrain utility vehicle to have a predefined turning radius;

said master controller unit switches from said all-wheel steering mode to said zero turning radius steering mode in which said master controller unit controls said steering motors to turn the diagonally located wheels in a same angular direction thereby enabling said all-terrain utility vehicle to have a zero turning radius and stability when said angular position of said wheels has reached a threshold angular position when operated in said four wheel steering mode based on input from said wheel encoders to said master controller unit; and said master controller unit in said crab steering mode, activates said plurality of steering motors to steer said plurality of wheels in the same angular direction thereby moving said all-terrain utility vehicle sideways or diagonally.

9. The all-terrain utility vehicle as claimed in claim 8, wherein:

said all-terrain utility vehicle includes:
an implement mounting system that includes a plurality of implement mounting members and a plurality of rotatable joint assemblies, wherein one end of each of said implement mounting member is connected to said chassis, wherein each of said rotatable joint assembly movably connects an implement to another end of corresponding said implement mounting member; and an implement position adjusting system that includes:
at least one first linear actuator mounted to said chassis that includes a final linearly movable member coupled to a front end of said implement; and
at least one second linear actuator mounted to said chassis that includes a final linearly movable member coupled to a rear end of said implement;

said implement mounting system mounts said implement at a center or away from the center of said chassis;

each of said rotatable joint assembly is a pin joint;

said final linearly movable member of said first linear actuator of said implement position adjusting system moves the front end of said implement in a direction towards or away with respect to said ground surface thereby changing angular position of the front end of said implement when said first linear actuator receives instruction(s) from said master controller unit, and while at the same time, said master controller unit activates said second linear actuator to rotate the rear end of the implement thereby accommodating the change in position of the front end of the implement;

said final linearly movable member of said second linear actuator of said implement position adjusting system moves the rear end of said implement in a direction towards or away with respect to said ground surface thereby changing the angular position of the rear end of said implement when said second linear actuator receives instruction(s) from said master controller unit and while at the same time, said master controller unit activates said first linear actuator to rotate the front end of the implement thereby accommodating the change in position of the rear end of the implement; and each of said first and second linear actuator is one of an electric linear actuator, an electro-magnetic linear actuator, a pneumatic linear actuator and a hydraulic linear actuator.

10. The all-terrain utility vehicle as claimed in claim 9, wherein:

said all-terrain utility vehicle includes a first user control module coupled to said master controller unit, wherein said first user control module includes:

a height adjusting control means that provides at least one input signal to said master controller unit to adjust the height of said chassis with respect to said ground surface;

a first implement position control means that provides at least one input signal to said master controller unit to adjust the position of the front end of said implement with respect to said ground surface;

a second implement position control means that provides at least one input signal to said master controller unit to adjust the position of the rear end of said implement with respect to said ground surface;

an all-wheel steering control means that provides at least one input signal to said master controller unit to steer said front wheels and said rear wheel in opposite direction thereby enabling said all-terrain utility vehicle to have predefined turning radius;

a two-wheel steering control means that provides at least one input signal to said master controller unit to steer said front wheels while maintaining said rear wheels in the straight position;

a crab steering control means that provides at least one input signal to said master controller unit to steer said plurality of wheels in the same angular direction;

a forward direction drive control means that provides input signal to said master controller unit to move the vehicle along a forward direction; and a reverse direction drive control means that provides input signal to said master controller unit to move the vehicle along a reverse direction; and said first user control module is a wired user control module which is provided on a dashboard of said vehicle.

11. The all-terrain utility vehicle as claimed in claim 10, wherein:

said master controller unit operates in one of an autonomous guidance mode, a manual guidance mode and a remote guidance mode, or a combination thereof;

said master controller unit in said autonomous guidance mode, controls said steering motors for guiding the vehicle to reach a target location based on a digital map and global positioning inputs received by said master controller unit;

said master controller unit in said manual guidance mode, displays the digital map on a display unit positioned on said steering wheel for navigating user of vehicle to reach the target location based on the global positioning inputs received by said master controller unit; and said master controller unit in said remote guidance mode, displays the digital map on said display unit of said second user control module for navigating a remote user for moving the vehicle to reach the target location based on the global positioning inputs received by said master controller unit.

12. The all-terrain utility vehicle as claimed in claim 10, wherein:

said all-terrain utility vehicle includes a second user control module coupled to said master controller unit, wherein said second user control module includes:

a height adjusting control means that provide at least one input signal to said master controller unit to adjust the height of said chassis with respect to said ground surface;

a first implement position control means that provides at least one input signal to said master controller unit to adjust the position of the front end of said implement with respect to said ground surface;

a second implement position control means that provides at least one input signal to said master controller unit to adjust the position of the rear end of said implement with respect to said ground surface;

an all-wheel steering control means that provides at least one input signal to said master controller unit to steer said front wheels and said rear wheels in opposite direction thereby enabling said all-terrain utility vehicle to have the predefined turning radius;

a two-wheel steering control means that provides at least one input signal to said master controller unit to steer said front wheels while maintaining said rear wheels in straight position;

a crab steering control means that provides at least one input signal to said master controller unit to steer said plurality of wheels in the same angular direction;

a display unit;

a steering direction control means that provides at least one input signal to said master controller unit to control said steering motors thereby controlling the steering of said wheels and direction of travel; and a throttle control means that provides at least one input signal to said master controller unit to control the acceleration of said user vehicle; and said second user control module is a wireless remote user control module.

13. The all-terrain utility vehicle as claimed in claim 12, wherein:

said master controller unit operates in one of an autonomous guidance mode, a manual guidance mode and a remote guidance mode, or a combination thereof;

said master controller unit in said autonomous guidance mode, controls said steering motors for guiding the vehicle to reach a target location based on a digital map and global positioning inputs received by said master controller unit;

said master controller unit in said manual guidance mode, displays the digital map on a display unit positioned on said steering wheel for navigating user of vehicle to reach the target location based on the global positioning inputs received by said master controller unit; and said master controller unit in said remote guidance mode, displays the digital map on said display unit of said second user control module for navigating a remote user for moving the vehicle to reach the target location based on the global positioning inputs received by said master controller unit.

14. A method for adjusting wheel track and wheelbase of an all-terrain utility vehicle as claimed in claim 1, said method comprising:

unlocking each swing arm from a corresponding swing arm position defining member by removing each locking member from a swing arm locking portion of the corresponding swing arm position defining member; and rotating each swing arm to a predefined position with respect to corresponding said swing arm position defining member, and locking each swing arm to corresponding said swing arm position defining member by inserting each locking member into one of plurality of another swing arm locking portions of the swing arm position defining member thereby adjusting a wheel track and a corresponding wheelbase of said all-terrain utility vehicle.

15. The method as claimed in claim 14, further comprising:

pivotably connecting, by a pivot assembly, one end of each swing arm to a chassis of said all-terrain utility vehicle, and connecting another end of each swing arm to a corresponding vertical axle, including:

said pivotably connecting, by a pivot assembly, one end of each swing arm to said chassis includes, disposing a top bearing inside a top mounting bracket of each pivot assembly;

disposing a bottom bearing inside a bottom mounting bracket of each pivot assembly;

pivotably connecting, by a pivot pin, each swing arm to the chassis through corresponding said bearings of corresponding each pivot assembly by inserting the pivot pin into said bearings and corresponding said swing arm; and securing each swing arm to corresponding pivot pin by using fasteners, where said fastener is a nut and washer.

16. The method as claimed in claim 15, further comprising:

positioning each swing arm position defining member above the top mounting bracket of corresponding pivot assembly; and securing each swing arm position defining member, and corresponding top mounting bracket and the corresponding bottom mounting bracket of each pivot assembly to the chassis by using fasteners, where said fasteners are a bolt and nut, wherein:

each second pivot assembly is inline and spaced away from corresponding first pivot assembly.

17. A method of adjusting wheelbase of an all-terrain utility vehicle as claimed in claim 1, said method comprising:

unlocking each swing arm from a corresponding first swing arm position defining member by removing each locking member from a swing arm locking portion of corresponding first swing arm position defining member;

removing each swing arm from corresponding first pivot assembly by dis-engaging each swing arm from a pivot pin of corresponding first pivot assembly; and securing each swing arm to a pivot pin of corresponding second pivot assembly thereby adjusting the wheelbase of said all-terrain utility vehicle.

* * * * *